United States Patent
Yao et al.

(10) Patent No.: US 11,593,916 B2
(45) Date of Patent: Feb. 28, 2023

(54) IMAGE SUPER-RESOLUTION METHOD AND APPARATUS

(71) Applicant: Huawei Technologies Co., Ltd., Shenzhen (CN)

(72) Inventors: Chunfeng Yao, Beijing (CN); Bailan Feng, Beijing (CN); Bo Yan, Shanghai (CN); Ke Li, Shanghai (CN); Bahetiyaer Bare, Shanghai (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/029,554

(22) Filed: Sep. 23, 2020

(65) Prior Publication Data

US 2021/0004935 A1    Jan. 7, 2021

Related U.S. Application Data

(63) Continuation of application No. PCT/CN2019/081445, filed on Apr. 4, 2019.

(30) Foreign Application Priority Data

Apr. 4, 2018    (CN) .......................... 201810299530.9

(51) Int. Cl.
*G06T 3/40* (2006.01)
*G06V 10/48* (2022.01)
(Continued)

(52) U.S. Cl.
CPC .......... *G06T 3/4053* (2013.01); *G06T 3/4038* (2013.01); *G06T 3/4084* (2013.01);
(Continued)

(58) Field of Classification Search
CPC ... G06T 3/4053; G06T 3/4038; G06T 3/4084; G06K 9/4633; G06K 9/4628; G06K 9/6271
See application file for complete search history.

(56) References Cited

U.S. PATENT DOCUMENTS

2007/0291170 A1    12/2007  Han et al.
2015/0262334 A1    9/2015   Li et al.

FOREIGN PATENT DOCUMENTS

CN    103366347 A    10/2013
CN    104376550 A    2/2015
(Continued)

OTHER PUBLICATIONS

Kim, J., Lee, J.K. and Lee, K.M., 2016. Accurate image super-resolution using very deep convolutional networks. In Proceedings of the IEEE conference on computer vision and pattern recognition (pp. 1646-1654).*

(Continued)

*Primary Examiner* — Zhitong Chen
(74) *Attorney, Agent, or Firm* — Conley Rose, P.C.

(57) ABSTRACT

An image super-resolution method includes preprocessing the low-resolution image to obtain a vertical gradient map, a horizontal gradient map, and a luminance map, which are used as three different dimensions of information to constitute a to-be-input feature map, performing size conversion on the to-be-input feature map to obtain an input feature map, performing nonlinear transformation on the input feature map to obtain an input feature map obtained after the nonlinear transformation, and performing weighted processing on the input feature map and the input feature map obtained after the nonlinear transformation, to obtain an output feature map, performing size conversion on the output feature map to obtain a residual map, and combining (Continued)

the low-resolution image and the residual map to obtain a high-resolution image.

20 Claims, 8 Drawing Sheets

(51) Int. Cl.
*G06V 10/44* (2022.01)
*G06V 10/764* (2022.01)
*G06V 10/82* (2022.01)

(52) U.S. Cl.
CPC ............ *G06V 10/454* (2022.01); *G06V 10/48* (2022.01); *G06V 10/764* (2022.01); *G06V 10/82* (2022.01)

(56) References Cited

FOREIGN PATENT DOCUMENTS

| CN | 106600538 A | 4/2017 |
|----|-------------|--------|
| CN | 106683067 A | 5/2017 |
| CN | 106709875 A | 5/2017 |
| CN | 106991646 A | 7/2017 |
| CN | 107358575 A | 11/2017 |
| CN | 108259994 A | 7/2018 |

OTHER PUBLICATIONS

Xian, Y. and Tian, Y., 2016. Single image super-resolution via internal gradient similarity. Journal of Visual Communication and Image Representation, 35, pp. 91-102.*

Choi, J.S. and Kim, M., 2017. Adeep convolutional neural network with selection units for super-resolution. In Proceedings of the IEEE conference on computer vision and pattern recognition workshops (pp. 154-160).*

Dong, C., Loy, C.C. and Tang, X., 2016, October. Accelerating the super-resolution convolutional neural network. In European conference on computer vision (pp. 391-407). Springer, Cham.*

Kim, J., et al., "Accurate Image Super-Resolution Using Very Deep Convolutional Networks," 2016 IEEE Conference an Computer Vision and Pattern Recognition, pp. 1646-1654.

Srivastava, R., et al., "Highway Networks," arXiv:1505.00387v2 [cs.LG], Nov. 3, 2015, 6 pages.

* cited by examiner

ATION TO RELATED
IMAGE SUPER-RESOLUTION METHOD AND APPARATUS

CROSS-REFERENCE TO RELATED APPLICATIONS

This application is a continuation of International Patent Application No. PCT/CN2019/081445, filed on Apr. 4, 2019, which claims priority to Chinese Patent Application No. 201810299530.9 filed on Apr. 4, 2018, both of which are hereby incorporated by reference in their entireties.

TECHNICAL FIELD

Embodiments of the present disclosure relate to the field of communications technologies, and in particular, to an image super-resolution method and apparatus.

BACKGROUND

Image super-resolution reconstruction is referred to as an image super-resolution for short, and is also referred to as image super-resolution (SR), which is a processing technology for reconstructing a low-resolution (LR) image into a high-resolution (HR) image using an image processing method, can effectively improve image definition, and is of great significance to various fields such as video surveillance, satellite images, camera photography, high-definition television, and medical imaging. For example, in the video surveillance field, a high-definition video better supports road traffic supervision, and effectively improves social security. However, many applications actually cannot directly obtain a high-resolution image or video for various reasons. The image super-resolution technology can effectively resolve the problem.

Currently, many image super-resolution methods have been proposed. Earlier image super-resolution methods are based on interpolation such as bicubic interpolation and Lanczos resampling. Because there are many solutions to mapping of each pixel from an LR image to an HR image, and only information about the LR image is used in such methods, the HR image cannot be reconstructed well. In recent years, with application of a convolutional neural networks (CNN) in the computer vision field, many CNN-based super-resolution methods appear, for example, very deep convolutional networks super resolution (VDSR). A neural network structure used in the VDSR has a plurality of direct network branches. In an embodiment, an output of a specific layer of neural network directly skips several layers of neural networks and then is directly connected to a processed signal. The direct network branch does not need to undergo an operation such as intermediate convolution such that when computing a loss function and returning a gradient, an output layer can directly deliver the gradient to the previous several layers using the direct branch, thereby avoiding a gradient disappearance problem occurring in a training process of a deep neural network (DNN), and improving convergence of the deep neural network.

To achieve a better super-resolution effect, the VDSR achieves better super-resolution performance by increasing a network depth. Consequently, a quantity of parameters is excessively large, and super-resolution is more time-consuming. In addition, although the VDSR can resolve a convergence problem to some extent based on the neural network structure having the plurality of direct network branches, a convergence problem still exists when a quantity of convolutional layers in the network reaches a specific value. Consequently, a super-resolution effect is affected, and image super-resolution quality is deteriorated.

SUMMARY

Embodiments of this application disclose an image super-resolution method and device in order to improve image super-resolution quality and obtain a better image super-resolution effect.

According to a first aspect, an embodiment of this application provides an image super-resolution method, including receiving a low-resolution image, preprocessing the low-resolution image to obtain a vertical gradient map, a horizontal gradient map, and a luminance map, using the vertical gradient map, the horizontal gradient map, and the luminance map as three different dimensions of information to constitute a to-be-input feature map, performing size conversion on the to-be-input feature map to obtain an input feature map, performing nonlinear transformation on the input feature map to obtain an input feature map obtained after the nonlinear transformation, and performing weighted processing on the input feature map and the input feature map obtained after the nonlinear transformation, to obtain an output feature map, performing size conversion on the output feature map to obtain a residual map, and combining the low-resolution image and the residual map to obtain a high-resolution image.

It should be noted that an embodiment of this application provided in the first aspect is an image super-resolution method based on a deep neural network. The deep neural network includes an input layer, at least one hidden layer, and an output layer. The input layer may be configured to receive a low-resolution image. The at least one hidden layer may be configured to preprocess the low-resolution image to obtain a vertical gradient map, a horizontal gradient map, and a luminance map, use the vertical gradient map, the horizontal gradient map, and the luminance map as three different dimensions of information to constitute a to-be-input feature map, perform size conversion on the to-be-input feature map to obtain an input feature map, perform nonlinear transformation on the input feature map to obtain an input feature map obtained after the nonlinear transformation, and perform weighted processing on the input feature map and the input feature map obtained after the nonlinear transformation, to obtain an output feature map, perform size conversion on the output feature map to obtain a residual map, and combine the low-resolution image and the residual map to obtain a high-resolution image. The output layer may be configured to output the high-resolution image.

In this embodiment of this application, weighted processing is performed on the input feature map and the input feature map obtained after the nonlinear transformation, to obtain the output feature map. Because one of the objects on which the weighted processing is performed, namely, the "input feature map", skips several hidden layers in the deep neural network, in other words, is directly obtained from the previous step without being processed, in other words, is directly obtained based on a direct branch in the deep neural network. The direct branch can well overcome a convergence problem of the deep neural network in order to improve an effect of image super-resolution based on the deep neural network. In addition, because values of the input feature map and the input feature map obtained after the nonlinear transformation are selected according to a corresponding proportion and then added in the weighted processing manner used herein, image quality of the finally reconstructed high-resolution image is greatly improved. Moreover, in this embodiment of this application, the low-resolution image and the residual map are combined to obtain the high-resolution image, in other words, the low-resolution image is directly obtained using the direct branch. Therefore, this embodiment of this application further overcomes the convergence problem of the deep neural network, and finally achieves a better image super-resolution effect.

In a possible implementation, before the performing weighted processing on the input feature map and the input feature map obtained after the nonlinear transformation, the method further includes obtaining a group of weighting values based on the input feature map, where the group of weighting values are used to perform weighted processing on the input feature map and the input feature map obtained after the nonlinear transformation.

In a possible implementation, the obtaining a group of weighting values based on the input feature map includes performing a convolution operation on the input feature map to obtain a convolution result, and processing the convolution result based on an S-shaped function to obtain a weighting value T, where the weighting value T is used to perform weighted processing on the input feature map and the input feature map obtained after the nonlinear transformation.

In a possible implementation, the using the horizontal gradient map and the luminance map as three different dimensions of information to constitute a to-be-input feature map includes using the horizontal gradient map as first dimension information, using the vertical gradient map as second dimension information, and using the luminance map as third dimension information, where the first dimension information, the second dimension information, and the third dimension information constitute the to-be-input feature map.

In a possible implementation, the performing nonlinear transformation on the input feature map to obtain an input feature map obtained after the nonlinear transformation includes performing a de-fitting operation on the input feature map to obtain a de-fitting result, and performing a convolution operation on the de-fitting result to obtain the input feature map obtained after the nonlinear transformation.

In this possible implementation, the de-fitting operation is first performed on the input feature map such that a quantity of parameters is reduced at the beginning. In this way, in a subsequent process of performing the convolution operation on the de-fitting result, because a quantity of input parameters of the convolution operation is reduced, a calculation amount of the convolution operation is reduced. This reduces super-resolution consumption, and increases an image super-resolution speed.

In a possible implementation, the combining the low-resolution image and the residual map to obtain a high-resolution image includes adding a pixel value of each pixel in the low-resolution image and a pixel value of a corresponding pixel in the residual map to obtain a pixel value of a corresponding pixel in the high-resolution image.

In a possible implementation, the combining the low-resolution image and the residual map to obtain a high-resolution image includes performing weighted addition on a pixel value of each pixel in the low-resolution image and a pixel value of a corresponding pixel in the residual map to obtain a pixel value of a corresponding pixel in the high-resolution image.

A coefficient used for the weighted addition is obtained based on a trained deep neural network, and the trained deep neural network may enable the output high-resolution image to have optimal image quality. Therefore, this possible implementation may improve quality of the output high-resolution image during image super-resolution.

In a possible implementation, the performing weighted processing on the input feature map and the input feature map obtained after the nonlinear transformation includes performing, based on weight information, weighted processing on the input feature map and the input feature map obtained after the nonlinear transformation, where the weight information is obtained using a trained deep neural network, the weight information includes a weighting value or a group of weighting values, and the group of weighting values may be represented by a weight map or a weight vector.

In a possible implementation, the performing, based on weight information, weighted processing on the input feature map and the input feature map obtained after the nonlinear transformation includes, when there is one weighting value, performing, using the weighting value, weighted addition on each first pixel value in the input feature map and each second pixel value in the input feature map obtained after the nonlinear transformation, to obtain a third pixel value of the output feature map, where the first pixel value is any pixel value in the input feature map, the second pixel values are in a one-to-one correspondence with the first pixel values, and the third pixel values are in a one-to-one correspondence with the first pixel values.

Because the weight information is obtained based on the trained deep neural network, different weighting values may be assigned to the input feature map and the input feature map obtained after the nonlinear transformation. The configuration of each weighting value can enable the output feature map to have a better expression capability such that the finally output high-resolution image has better image quality.

Alternatively, the performing, based on weight information, weighted processing on the input feature map and the input feature map obtained after the nonlinear transformation includes, when there is a group of weighting values, separately performing, using each of the group of weighting values, weighted addition on each first pixel value in the input feature map and each second pixel value in the input feature map obtained after the nonlinear transformation, to obtain a third pixel value of the output feature map, where the first pixel value is any pixel value in the input feature map, the second pixel values are in a one-to-one correspondence with the first pixel values, and the third pixel values are in a one-to-one correspondence with the first pixel values.

Because the weight information is obtained using the trained deep neural network, the trained deep neural network may enable the output high-resolution image to have optimal image quality. Therefore, each weighting value obtained using the trained deep neural network can enable the output feature map to have a better expression capability. Further, when there is a group of weighting values, different weighting values may be more pertinently assigned to different local features in the input feature map such that there are more possible output feature maps, and a high-resolution image of higher quality is obtained using the image super-resolution method.

According to a second aspect, an embodiment of this application provides an image super-resolution method, including receiving a low-resolution image, preprocessing the low-resolution image to obtain a vertical gradient map, a horizontal gradient map, and a luminance map, using the vertical gradient map, the horizontal gradient map, and the luminance map as three different dimensions of information to constitute a to-be-input feature map, performing size conversion on the to-be-input feature map to obtain an input feature map, performing weighted processing on the input feature map based on a serial weighted processing procedure, to obtain an output feature map, where the serial weighted processing procedure includes n processing stages, and the n processing stages are serially connected, and the serial weighted processing procedure includes n groups of weighting values, and the n groups of weighting values are respectively used for the n processing stages and are in a one-to-one correspondence with the n processing stages, where n is a positive integer greater than or equal to 2, performing size conversion on the output feature map to obtain a residual map, and combining the low-resolution image and the residual map to obtain a high-resolution image.

It should be noted that an embodiment of this application provided in the first aspect is an image super-resolution method based on a deep neural network. The deep neural network includes an input layer, at least one hidden layer, and an output layer. The input layer may be configured to receive a low-resolution image. The at least one hidden layer may be configured to preprocess the low-resolution image to obtain a vertical gradient map, a horizontal gradient map, and a luminance map, use the vertical gradient map, the horizontal gradient map, and the luminance map as three different dimensions of information to constitute a to-be-input feature map, perform size conversion on the to-be-input feature map to obtain an input feature map, perform weighted processing on the input feature map based on a serial weighted processing procedure, to obtain an output feature map, where the serial weighted processing procedure includes n processing stages, and the n processing stages are serially connected, and the serial weighted processing procedure includes n groups of weighting values, and the n groups of weighting values are respectively used for the n processing stages and are in a one-to-one correspondence with the n processing stages, where n is a positive integer greater than or equal to 2, perform size conversion on the output feature map to obtain a residual map, and combine the low-resolution image and the residual map to obtain a high-resolution image. The output layer may be configured to output the high-resolution image.

In a possible implementation, weighted processing is performed on the input feature map based on the serial weighted processing procedure, to obtain the output feature map. The serial weighted processing procedure includes the n processing stages, and the n processing stages are serially connected. A key difference between this embodiment of this application and the image super-resolution method provided in the first aspect is as follows. In the first aspect, the output feature map is output by performing weighted processing once on the input feature map and the input feature map obtained after nonlinear transformation, and then is processed in a next step. In the image super-resolution method provided in the second aspect, the serial weighted processing procedure includes the n processing stages, and a round of weighted processing operation is performed in each processing stage. In an embodiment, an output of the first processing stage is not directly used as the output feature map for outputting, but is used as an input of the second processing stage such that weighted processing is performed in the second processing stage again, until weighted processing is completed in the last processing stage in the serial weighted processing procedure. An output of the last processing stage is used as the output feature map such that the output feature map is further processed in a next step. Compared with the single-round weighted processing in the first aspect, the serial weighted processing procedure may enable quality of the reconstructed high-resolution image to be better than quality of the high-resolution image obtained using the method provided in the first aspect, in other words, may achieve a better image super-resolution effect.

In a possible implementation, the performing weighted processing on the input feature map based on a serial weighted processing procedure, to obtain an output feature map includes a processing process of a processing stage i in the n processing stages includes separately performing upper channel processing and lower channel processing on an input feature map of the processing stage i, where the upper channel processing includes obtaining a group of weighting values of the processing stage i based on the input feature map of the processing stage i, and the lower channel processing includes performing nonlinear transformation on the input feature map of the processing stage i to obtain, through the lower channel processing, an input feature map of the processing stage i obtained after the nonlinear transformation, and performing, based on the group of weighting values of the processing stage i, weighted processing on the input feature map of the processing stage i and the input feature map of the processing stage i obtained after the nonlinear transformation, to obtain an output feature map of the processing stage i, where the processing stage i is any one of the n processing stages, and when the processing stage i is the first stage in the serial weighted processing procedure, the input feature map of the processing stage i is the input feature map, or when the processing stage i is the last stage in the serial weighted processing procedure, the output feature map of the processing stage i is the output feature map.

In a possible implementation, the upper channel processing includes performing a convolution operation on the input feature map of the current processing stage to obtain an upper channel convolution result, and processing the upper channel convolution result based on an S-shaped function to obtain a group of weighting values of the current processing stage.

In a possible implementation, the lower channel processing further includes performing de-fitting on the input feature map of the current processing stage to obtain a de-fitting result, and performing a convolution operation on the de-fitting result to obtain the nonlinear transformation result.

In a possible implementation, the performing weighted processing on the input feature map based on a serial weighted processing procedure, to obtain an output feature map includes a processing process of a processing stage i in the n processing stages includes performing nonlinear transformation on an input feature map of the processing stage i to obtain an input feature map of the processing stage i obtained after the nonlinear transformation, and performing, based on a group of weighting values that are in a one-to-one correspondence with the processing stage i, weighted processing on the input feature map of the processing stage i and the input feature map of the processing stage i obtained after the nonlinear transformation, to obtain an output feature map of the processing stage i, where the processing stage i is any one of the n processing stages, and $1 \leq i \leq n$, and when the processing stage i is the first stage in the serial weighted processing procedure, the input feature map of the processing stage i is the input feature map, or when the processing stage i is the last stage in the serial weighted processing procedure, the output feature map of the processing stage i is the output feature map.

In a possible implementation, before the performing, based on a group of weighting values that are in a one-to-one correspondence with the processing stage i, weighted processing on the input feature map of the processing stage i and the input feature map of the processing stage i obtained after the nonlinear transformation, the method further includes obtaining the group of weighting values of the processing stage i based on the input feature map of the processing stage i, where the group of weighting values of the processing stage i are used to perform weighted processing on the input feature map of the processing stage i and the input feature map of the processing stage i obtained after the nonlinear transformation.

In a possible implementation, the obtaining the group of weighting values of the processing stage i based on the input feature map of the processing stage i includes performing a convolution operation on the input feature map of the processing stage i to obtain a convolution result, and processing the convolution result based on an S-shaped function to obtain the group of weighting values of the processing stage i.

In a possible implementation, the performing nonlinear transformation on an input feature map of the processing stage i to obtain an input feature map of the processing stage i obtained after the nonlinear transformation includes performing de-fitting on the input feature map of the processing stage i to obtain a de-fitting result, and performing a convolution operation on the de-fitting result to obtain the input feature map of the processing stage i obtained after the nonlinear transformation.

In a possible implementation, n is equal to 3.

In a possible implementation, the combining the low-resolution image and the residual map to obtain a high-resolution image includes adding a pixel value of each pixel in the low-resolution image and a pixel value of a corresponding pixel in the residual map to obtain a pixel value of a corresponding pixel in the high-resolution image.

In a possible implementation, the combining the low-resolution image and the residual map to obtain a high-resolution image includes performing weighted addition on a pixel value of each pixel in the low-resolution image and a pixel value of a corresponding pixel in the residual map to obtain a pixel value of a corresponding pixel in the high-resolution image.

A coefficient used for the weighted addition is obtained using a trained deep neural network (a training process of the deep neural network is mainly a training process of a connection parameter of each layer of neural network, and is briefly described in this embodiment of this application), and a weighting coefficient obtained using the trained deep neural network may enable the output high-resolution image to have optimal image quality. Therefore, this possible implementation may improve quality of the output high-resolution image during image super-resolution.

In a possible implementation, each of the n groups of weighting values includes at least one weighting value ("at least one" includes "one" and "at least two"). When one group of weighting values includes one weighting value, in a processing stage corresponding to the group of weighting values, weighted processing of the stage is performed based on the weighting value. When one group of weighting values includes at least two weighting values, in a processing stage corresponding to the group of weighting values, weighted processing of the stage is performed based on the at least two weighting values. Specifically, different weighting values may be assigned to different parts in an input feature map that is input into the stage such that there are more diversified feature maps that are output in the processing stage corresponding to the at least two weighting values, and there are more possible feature maps that are output in the stage. Therefore, a high-resolution image of higher quality is obtained using the image super-resolution method.

According to a third aspect, an image super-resolution apparatus is provided. The apparatus includes a module configured to perform the method in the first aspect or any possible implementation of the first aspect.

According to a fourth aspect, an image super-resolution apparatus is provided. The apparatus includes a module configured to perform the method in the second aspect or any possible implementation of the second aspect.

According to a fifth aspect, an image super-resolution apparatus is provided. The apparatus includes a storage medium and a central processing unit, the storage medium may be a non-volatile storage medium, and the storage medium stores a computer executable program. The central processing unit is connected to the non-volatile storage medium, and executes the computer executable program to implement the method in the first aspect or any possible implementation of the first aspect.

According to a sixth aspect, an image super-resolution apparatus is provided. The apparatus includes a storage medium and a central processing unit, the storage medium may be a non-volatile storage medium, and the storage medium stores a computer executable program. The central processing unit is connected to the non-volatile storage medium, and executes the computer executable program to implement the method in the second aspect or any possible implementation of the second aspect.

According to a seventh aspect, a chip is provided. The chip includes a processor and a data interface, and the processor reads, using the data interface, an instruction stored in a memory, to perform the method in the first aspect or any possible implementation of the first aspect.

Optionally, in an implementation, the chip may further include the memory. The memory stores the instruction, and the processor is configured to execute the instruction stored in the memory. When executing the instruction, the processor is configured to perform the method in the first aspect or any possible implementation of the first aspect.

According to an eighth aspect, a chip is provided. The chip includes a processor and a data interface, and the processor reads, using the data interface, an instruction stored in a memory, to perform the method in the second aspect or any possible implementation of the second aspect.

Optionally, in an implementation, the chip may further include the memory. The memory stores the instruction, and the processor is configured to execute the instruction stored in the memory. When executing the instruction, the processor is configured to perform the method in the second aspect or any possible implementation of the second aspect.

According to a ninth aspect, a computer-readable storage medium is provided. The computer-readable medium stores program code executed by a device, and the program code includes an instruction used to perform the method in the first aspect or any possible implementation of the first aspect.

According to a tenth aspect, a computer-readable storage medium is provided. The computer-readable medium stores program code executed by a device, and the program code includes an instruction used to perform the method in the second aspect or any possible implementation of the second aspect.

BRIEF DESCRIPTION OF DRAWINGS

The following describes the accompanying drawings in the embodiments of this application.

DESCRIPTION OF EMBODIMENTS

Figure 1:
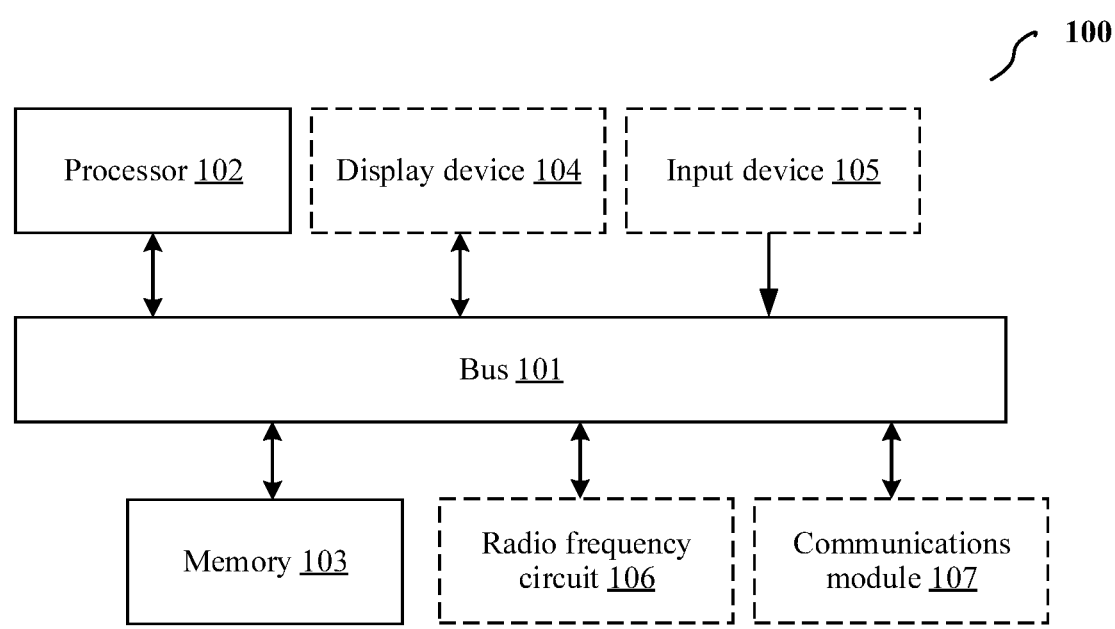
FIG. 1 is a schematic structural diagram of an electronic device 100 used for neural network computing according to an embodiment of this application.

For ease of understanding of the embodiments of this application, some concepts or terms in the embodiments of this application are first described.

(1) Image super-resolution reconstruction (referred to as an image super-resolution for short and also referred to as image super-resolution).

The image super-resolution is a technology using an image processing method to recover an HR image from an LR image using a computer. The high-resolution image means that the image has a high pixel density, and can provide more image details. These details usually play a key role in applications.

There may be two types of image super-resolution methods a conventional image super-resolution method in which an HR is recovered from an LR using a data operation, and a learning-based image super-resolution method in which an HR is recovered from an LR using a machine learning method. A high-resolution image with a maximum posterior probability may be statistically estimated based on a reconstructed image super-resolution method using a frequency domain algorithm or a space domain algorithm. The learning-based image super-resolution method may include two phases a training stage and a testing phase.

In the training phase, an initial super-resolution model and training set are first established. The training set may include a plurality of low-resolution images and high-resolution images corresponding to the low-resolution images. A correspondence between a high-resolution image and a low-resolution image is learned using the low-resolution image and the high-resolution image corresponding to the low-resolution image in the training set, to correct a value of a parameter in the initial super-resolution model such that an error between a high-resolution image and a reconstructed image is converged, and finally a new super-resolution model obtained after the training is determined. In the testing phase, the new super-resolution model may be used to guide image super-resolution reconstruction.

A method for obtaining an image pair (a low-resolution image and a high-resolution image corresponding to the low-resolution image constitute an image pair) in the training set may be first obtaining a high-resolution image, and then processing the high-resolution image using a fuzzy function to obtain a low-resolution image corresponding to the high-resolution image. The fuzzy function is irreversible.

The initial super-resolution model may be a model determined based on experiments, and may be nonlinear. The super-resolution model may be a CNN.

(2) CNN.

A neural network may include a neural unit. The neural unit may be an operation unit using $x_s$ and an intercept of 1 as inputs, and an output of the operation unit may be $$h_{W,b}(x) = f(W^T x) = f(\Sigma_{s=1}^{n} W_s x_s + b) \quad (1\text{-}1).$$

Herein, $s=1, 2, \ldots, n$, n is a natural number greater than 1, $W_s$ is a weight of $x_s$, and b is an offset of the neural unit, and f is an activation function (activation functions) of the neural unit, and is used to introduce a nonlinear feature into the neural network, to convert an input signal in the neural unit into an output signal. The output signal of the activation function may be used as an input of a next convolutional layer. The activation function may be a sigmoid function. The neural network is a network formed by combining many neural units. In other words, an output of one neural unit may be an input of another neural unit. An input of each neural unit may be connected to a local receptive field of a previous layer to extract a feature of the local receptive field. The local receptive field may be a region including several neural units.

(3) Deep Neural Network.

The DNN may be understood as a neural network having many hidden layers. There is no special metric standard for "many" herein. A multi-layer neural network and the deep neural network are essentially the same. From the perspective of locations of different layers in the DNN, there may be three types of neural networks in the DNN an input layer, a hidden layer, and an output layer. Usually, the first layer is an input layer, the last layer is an output layer, and layers in the middle are all hidden layers. The layers are fully connected to each other. In other words, any neuron at an $i^{th}$ layer is definitely connected to any neuron at an $(i+1)^{th}$ layer. Although the DNN seems complex, work of each layer is actually not complex, and is simply described using the following linear relationship expression $\vec{y} = \alpha(W\vec{x} + \vec{b})$, where $\vec{x}$ is an input vector, $\vec{y}$ is an output vector, $\vec{b}$ is an offset vector, W is a weight matrix (also referred to as a coefficient), and $\alpha(\ )$ is an activation function. At each layer, the output vector $\vec{y}$ is obtained by performing a simple operation on the input vector $\vec{x}$. Because there are many layers in the DNN, there are also many coefficients W and many offset vectors $\vec{b}$. Therefore, the parameters in the DNN are specifically defined as follows: First, the coefficient W is defined as follows: A DNN including three layers is used as an example. For example, linear coefficients from the fourth neuron at the second layer to the second neuron at the third layer are defined as $w_{24}^{3}$, where a superscript 3 represents a number of a layer at which the coefficient W is located, and a subscript corresponds to an output index of 2 at the third layer and an input index of 4 at the second layer. In conclusion, coefficients from a $k^{th}$ neuron at an $(L-1)^{th}$ layer to a $j^{th}$ neuron at an $L^{th}$ layer are defined as $W_{jk}^{L}$. It should be noted that the input layer does not include the parameter W. In the deep neural network, more hidden layers enable the network to better describe a complex case in the real world. Theoretically, a model including a larger quantity of parameters has higher complexity and a larger "capacity", and can complete a more complex learning task.

(4) CNN. The CNN is a deep neural network of a convolutional structure. The CNN includes a feature extractor including a convolutional layer and a sub-sampling layer. The feature extractor may be considered as a filter. A convolution process may be considered as performing convolution on an input image or a convolution feature map using a trainable filter. The convolutional layer is a neuron layer that is in the CNN and that performs convolution processing on an input signal. One neuron at the convolutional layer in the CNN may be connected only to some neurons at an adjacent layer. One convolutional layer usually includes several feature maps, and each feature map may include some neural units arranged in a rectangular form. Neural units of a same feature map share a weight. The shared weight herein is a convolution kernel. Weight sharing may be understood as that an image information extraction manner is unrelated to a location. The principle implied herein is that statistical information of a part of an image is the same as that of another part. In other words, image information that is learned from one part can also be used for another part. Therefore, same learned image information can be used for all locations in the image. At a same convolutional layer, a plurality of convolution kernels may be used to extract different image information. Usually, with more convolution kernels, a convolution operation reflects more diversified image information.

The convolution kernel may be initialized in a form of a matrix with a random size, and an appropriate weight may be learned using the convolution kernel in a training process of the CNN. In addition, a direct benefit of the weight sharing is to reduce a quantity of connections between layers of the CNN, and reduce an over-fitting risk.

(5) Back Propagation Algorithm.

A CNN may correct a value of a parameter in an initial super-resolution model in a training process using an error back propagation algorithm in order to reduce a reconstruction error loss of the super-resolution model. Specifically, an error loss is generated in a process of transmitting an input signal forward to an output, and the parameter in the initial super-resolution model is updated using back propagation error loss information such that the error loss is converged. The back propagation algorithm is an error loss-centered back propagation motion, and is intended to obtain an optimal parameter in the super-resolution model, for example, a weight matrix.

(6) Pixel Values and Image Features.

A pixel value of an image may be a red green blue (RGB) color value, and the pixel value may be a long integer indicating a color. For example, the pixel value is 256*Red+100*Green+76Blue, where Blue represents a blue component, Green represents a green component, and Red represents a red component. For each color component, a smaller value indicates lower luminance, and a larger value indicates higher luminance. For a grayscale image, a pixel value may be a grayscale value.

An image feature mainly includes a color feature, a texture feature, a shape feature, a spatial relationship feature, and the like of an image.

The color feature is a global feature, and describes a surface property of a scene corresponding to an image or an image region. The color feature is usually a pixel-based feature. In this case, all pixels belonging to the image or the image region have respective contributions. Because the color is insensitive to changes of a direction, a size, and the like of the image or the image region, the color feature cannot well capture a local feature of an object in the image.

The texture feature is also a global feature, and also describes a surface property of a scene corresponding to an image or an image region. However, a texture is only a feature of a surface of an object, and cannot completely reflect an essential attribute of the object. Therefore, higher-level image content cannot be obtained using only the texture feature. Different from the color feature, the texture feature is not a pixel-based feature, but needs to be statistically calculated in a region including a plurality of pixels.

The shape feature is represented using two methods a contour feature and a region feature. The contour feature of the image is mainly for an outer boundary of the object, and the region feature of the image is related to an entire shape region.

The spatial relationship feature is a mutual spatial location or a relative direction relationship between a plurality of objects that are segmented from the image. The relationship may be divided into a connection/adjacency relationship, a crossover/overlapping relationship, an inclusion/accommodation relationship, and the like. Spatial location information may be usually divided into relative spatial location information and absolute spatial location information. The relative spatial location information emphasizes a relative status between targets, for example, an up and down relationship or a left and right relationship. The absolute spatial location information emphasizes a distance between targets and orientations of the targets.

It should be noted that the foregoing listed image features may be used as some examples of features of the image, and the image may further have other features, for example, higher-level features such as a semantic feature. This is not described herein.

A relationship between a vertical gradient map, a horizontal gradient map, or a luminance map that is to be mentioned in the embodiments of this application and each image feature described above may be further as follows. The vertical gradient map and the horizontal gradient map in the embodiments of this application describe transformation between adjacent pixels. Horizontal transformation is represented by the horizontal gradient map, and vertical transformation is represented by the vertical gradient map. Both the vertical gradient map and the horizontal gradient map include a texture feature and a shape feature. The luminance map includes a color feature. It may be considered that the vertical gradient map, the horizontal gradient map, and the luminance map in the embodiments of this application are comprehensive reflection of some features in the foregoing plurality of image features.

During image super-resolution, to achieve a better image super-resolution effect, a deep neural network that is relatively deep, namely, a deep neural network having a plurality of layers, may be used. However, a larger quantity of layers of the deep neural network indicates a larger quantity of parameters corresponding to the deep neural network, a larger calculation amount, and higher super-resolution consumption. In addition, when a depth of the deep neural network reaches a specific value, a difficulty in convergence is inevitably caused.

To improve quality of an HR image obtained through image super-resolution processing in an image super-resolution process, the embodiments of this application provide an image super-resolution method such that a low-resolution image is reconstructed using a deep neural network structure combining a highway network and a residual network, to obtain a high-resolution image.

It should be noted that the highway network and the residual network may be considered as special deep neural networks, and further, may be understood as special connection manners between a plurality of hidden layers in the deep neural network. It may be understood that some or all steps in the image super-resolution method in the embodiments of this application are based on the special deep neural network structure including the highway network and the residual network, and are implemented by the special deep neural network. It may be understood that the image super-resolution method provided in the embodiments of this application is performed based on a trained deep neural network, and the trained deep neural network may include a residual network and a highway network. It may be understood that the residual network and the highway network used in the embodiments of this application are obtained through training, and may also be referred to as trained neural networks. For brevity, details are not described below.

For brevity, the residual network may be as follows. In addition to a plurality of hidden layers in the deep neural network that are connected layer by layer, for example, a first-layer hidden layer is connected to a second-layer hidden layer, the second-layer hidden layer is connected to a third-layer hidden layer, and the third-layer hidden layer is connected to a fourth-layer hidden layer (this is a data operation path of the neural network, and may also be referred to as neural network transmission), the residual network further includes a direct branch. The direct branch directly connects the first-layer hidden layer and the fourth-layer hidden layer, in other words, skips processing of the second-layer hidden layer and that of the third-layer hidden layer, and directly transmits data of the first-layer hidden layer to the fourth-layer hidden layer for operation. The highway network may be as follows. In addition to the foregoing operation path and direct branch, the deep neural network further includes a weight obtaining branch. The branch introduces a transmission gate (transform gate) to obtain a weighting value, and outputs a weighting value T for subsequent operation of the foregoing operation path and direct branch.

In the embodiments of this application, the weighting value T obtained using the weight obtaining branch is used to perform weighted processing on an input feature map obtained using the direct branch and a processed input feature map obtained by processing the input feature map using the operation path in which a layer-by-layer connection exists, to obtain an output feature map. In the processing process, a gradient disappearance problem of the deep neural network can be better overcome such that convergence of the deep neural network is better. In addition, using the output feature map obtained after the weighted processing, information required by a high-resolution image during image super-resolution can be better described, and the output high-resolution image has better image quality. Moreover, in the embodiments of this application, according to an idea of the residual network, the input feature map directly skips several hidden layers and reaches a specific layer using the direct branch, and a high-resolution image is obtained by combining, at the layer, the input feature map and the residual map obtained after the processing. This design of the direct branch further achieves a better convergence effect such that the deep neural network in the embodiments of this application has a better convergence capability, thereby bringing higher image super-resolution efficiency and a better image super-resolution effect to the image super-resolution method based on the deep neural network.

After some concepts or terms in the embodiments of this application are described, it should be noted that according to the image super-resolution method and apparatus provided in the embodiments of this application, it may be understood that the image super-resolution method provided in the embodiments of this application is performed based on the deep neural network, and further, may be performed based on the CNN. It may be learned from the foregoing concept descriptions that the CNN may be understood as a special deep neural network, in other words, the CNN is a deep neural network of a convolutional structure. The CNN may be trained in advance. Because the CNN is used for image super-resolution in the embodiments of this application, the CNN used for image super-resolution is also referred to as a super-resolution network below.

The following briefly describes a training process of the super-resolution network in the embodiments of this application.

Before this, the training process of the deep neural network needs to be briefly described.

First, work of each layer in the deep neural network may be described using a mathematical expression $\vec{y}=\alpha(W\cdot\vec{x}+\vec{b})$. At a physical layer, the work of each layer in the deep neural network may be understood as completing transformation from input space to output space (in other words, from row space to column space of a matrix) using five operations performed on the input space (a set of input vectors). The five operations are as follows. 1. Dimension elevation/Dimension reduction. 2. Zooming in/Zooming out. 3. Rotating. 4. Shifting. 5. "Bending". The operations 1, 2, and 3 are completed by $W\cdot\vec{x}$, the operation 4 is completed by $+\vec{b}$, and the operation 5 is completed by $\alpha(\ )$. The word "space" is used herein for expression because a classified object is not a single object, but a type of object. The space is a set of all objects of a same type. W is a weight vector, and each value of the vector represents a weighting value of a neuron in this layer of neural network. The vector W determines spatial transformation from the input space to the output space, in other words, a weight W at each layer controls how to transform the space. An objective of training the deep neural network is to finally obtain a weight matrix (a weight matrix including vectors W of a plurality of layers) of all layers of the trained neural network. Therefore, the training process of the neural network is essentially a manner of learning and controlling the spatial transformation, and more specifically, is a manner of learning the weight matrix.

Then, the training process of the deep neural network is further described as follows.

Because an output of the deep neural network expects to be as much as possible close to a value that actually wants to be predicted, a current predicted value of the network and an expected target value are compared such that a weight vector of each layer of neural network can be updated based on a difference between the predicted value and the target value (certainly, there is usually an initialization process before first updating, in an embodiment, a parameter is preconfigured for each layer of the deep neural network). For example, if the predicted value of the network is excessively large, the weight vector is adjusted to obtain a smaller predicted value, and is continuously adjusted until the neural network can predict the expected target value.

Therefore, "how to compare a predicted value and a target value" needs to be predefined, which is a loss function or an objective function. The loss function and the objective function are important equations used to measure a difference between a predicted value and a target value. In an example of the loss function, a higher output value (loss) of the loss function indicates a larger difference. Therefore, the training of the deep neural network is a process of reducing the loss as much as possible.

A training process of a super-resolution network in the embodiments of this application is as follows. First, a system configures a parameter for the super-resolution network, and the parameter is an initialized parameter and does not need to be learned. The parameter configured by the system is essentially an initialized matrix vector, and is used to configure a network structure and a connection relationship between layers of a neural network. Then, a training dataset needs to be constructed. The training dataset herein includes several pairs of low-resolution images and high-resolution images, in other words, each pair includes a low-resolution image and a high-resolution image corresponding to the low-resolution image. The paired low-resolution images and high-resolution images are input into the foregoing configured super-resolution network, and are computed using weight vectors of the layers of the super-resolution network, to output a reconstructed high-resolution image. A loss function is computed based on the output high-resolution image and the high-resolution image included in the training dataset, computing is performed based on a back propagation algorithm of the neural network, and a parameter of each layer that needs to be learned in the super-resolution network, to obtain an updated parameter of each layer, namely, a weight vector W. Then, several pairs of low-resolution images and high-resolution images included in the training dataset continue to be trained based on a weight matrix including the updated weight vector W of each layer (because each weight vector in the matrix is updated, the connection relationship between the layers in the network is updated with the weight vector), until a difference between the reconstructed high-resolution image that is output in the super-resolution network and the high-resolution image included in the training dataset, or a loss of the loss function meets a preset condition. In this case, the trained weight matrix is output, and the training is completed.

The trained super-resolution network may be used to perform the image super-resolution method in the embodiments of this application. This relates to an application process of the super-resolution network, in other words, the high-resolution image may be obtained by inputting the low-resolution image into the trained super-resolution network. The following describes this process in detail, and details are not described herein.

In addition, using an image evaluation method (for example, a specific assessment function), quality assessment may be performed on the high-resolution image obtained by performing image super-resolution based on the trained super-resolution network, and the foregoing trained super-resolution network may be updated based on an assessment result. For example, a high-resolution image with a relatively high score and a low-resolution image corresponding to the high-resolution image are used as positive samples, a high-resolution image with a relatively low score and a low-resolution image corresponding to the high-resolution image are used as negative samples, and the positive samples and the negative samples are input again to the foregoing trained super-resolution network. In this way, iterative improvement may be continuously performed on a super-resolution image with poor quality in order to obtain a better super-resolution network, and output a high-resolution image with better quality to an image super-resolution application. Optionally, fine tuning training may also be performed on the super-resolution network after more training datasets are newly added such that the super-resolution network can continuously perform expansion training on new data in an application, thereby achieving a better image super-resolution effect.

Then, a hardware running environment in the embodiments of this application is briefly described.

First, it should be noted that the image super-resolution method provided in the embodiments of this application may be performed on a server, may be performed on a cloud, or may be performed on a terminal (for example, a mobile phone, a computer, a camera, or a self-driving vehicle). More specifically, data computing in the embodiments of this application may be performed by a conventional hardware structure of a processor and a memory, may be performed by a hardware structure of a processor, a neural network processor, and a memory, or may be performed by a processing structure of a neural network processor and a memory. This is not limited in this application. The following uses the processing structure of the processor, the neural network processor, and the memory as an example. As shown in FIG. 1.

FIG. 1 shows an electronic device 100 used for neural network computing. The electronic device 100 includes a processor 102 and a memory 103. The processor 102 may be a general name of a plurality of processors. The processor 102 may include only a conventional processor such as a central processing unit (CPU), or may include a conventional processor and a neural network processor (the neural network processor herein may be a processor used for a neural network operation, but is not limited to a dedicated neural network processor). A common neural network processor may include but is not limited to a graphics processing unit (GPU), a neural-network processing unit (NPU), and a tensor processing unit (TPU).

For example, the processor 102 may include the CPU. The processor 102 may include the CPU and the GPU, or the processor 102 may include the CPU, the GPU, and the NPU, or the processor 102 may include the CPU, the GPU, the NPU, and the TPU, or may be a combination of one or two of the CPU, the GPU, the NPU, and the TPU. There may be one or more CPUs, GPUs, NPUs, or TPUs in the foregoing examples. This needs to be determined based on a calculation amount and a calculation type that correspond to a specific application scenario of the neural network. This is not limited in this embodiment of this application.

The electronic device 100 may be a printed circuit board (PCB), an integrated circuit (IC), or a communications device such as a mobile phone or a portable computer. In an implementation, the processor 102 and the memory 103 are disposed on the PCB board as two discrete devices. When the processor 102 includes a plurality of processors, the plurality of processors may be disposed on the PCB board as independent devices. In another implementation, the processor 102 and the memory 103 are integrated or encapsulated into one IC. It may be understood that the foregoing two components may be integrated or separated based on a requirement. For example, when the processor 102 includes a plurality of processors, the plurality of processors may be integrated or encapsulated into one application-specific integrated circuit (ASIC), and then disposed on the PCB board together with the memory 103. When the processor 102 includes a plurality of processors, the plurality of processors may be communicatively coupled to each other and the plurality of processors may be communicatively coupled to the memory 103, and there is a high-speed data transmission connection thereof. The high-speed data transmission connection may be implemented using a bus 101 through which the plurality of processors in the processor 102 are separately communicatively connected to the memory 103. The bus 101 may be an advanced extensible interface (AXI) bus protocol or another bus protocol.

When the processor 102 includes a CPU, the CPU is configured to run a software program and/or an instruction stored in the memory 103, to execute various functions of the electronic device 100. The CPU may be a CPU based on an X86 architecture, an ARM architecture, and a cortex-A architecture. The memory 103 may include a volatile memory such as a random-access memory (RAM), or may include a non-volatile memory such as a flash memory, a hard disk, or a solid-state drive (SSD), or may be a combination of the foregoing memories. The memory 103 is configured to store a related instruction and data. When the processor 102 includes a processor used for a neural network operation, the neural network processor may be an independent hardware chip, or may be a computing circuit with which the processor 102 is integrated into one hardware chip, for example, an intellectual property (IP) core. The one or more hardware chips may be an ASIC, a programmable logic device (PLD), or a combination of the foregoing hardware chips. The PLD may be a field-programmable logic gate array (FPGA), generic array logic (GAL), or the like.

Optionally, the electronic device 100 further includes a display device 104, an input device 105, a radio frequency circuit 106, and a communications module 107. The display device 104 is configured to output a visible text, graph, video, and any combination thereof, and the display device 104 may be a liquid-crystal display (LCD) or a light-emitting polymer display (LPD). A user may input a command and information into the electronic device 100 using the input device 105, for example, to-be-identified image data or sound data (which may be an image on which super-resolution reconstruction is to be performed in this embodiment of this application). The input device 105 may be a mouse, a keyboard, a scanner, a camera, or the like. The radio frequency circuit 106 is configured to receive and send an electromagnetic wave, convert an electrical signal into an electromagnetic wave or convert an electromagnetic wave into an electrical signal, and communicate with a communications network or another communications device using the electromagnetic wave. The communications module 107 is configured to process communication data, for example, communication data represented by an electromagnetic wave received by the radio frequency circuit 106 and an electrical signal obtained through conversion.

In an implementation, when the processor 102 includes a CPU, the CPU and the memory 103 are connected using the bus 101. The CPU obtains, from the memory 103 using the bus 101, input data, an input parameter, and an instruction that are used for a neural network operation. The input data includes neural network data that needs to be computed, for example, to-be-identified image data and sound data. The input parameter includes a parameter used for neural network computing, for example, a neural network parameter that is trained offline. The instruction includes information for indicating a neural network layer, and the CPU configures, according to the instruction, a computing mode of a corresponding neural network layer. The computing mode may include operations such as multiplication, addition, and radication, or a combination of these operations. Optionally, the CPU may also process computing of a plurality of neural network layers, for example, a convolutional layer, a fully connected layer, a pooling layer, and a normalized layer.

In an implementation, when the processor 102 includes a conventional processor and a neural network processor, the neural network processor and the conventional processor (for example, a CPU) may be integrated into one hardware chip, or may be independent hardware chips. The CPU, the memory 103, and the neural network processor are communicatively connected using the bus 101 in the electronic device 100, to form a data path. The CPU controls, using the bus 101, the neural network processor to start a neural network operation. When completing the neural network computing, the neural network processor notifies, using the bus 101, the processor 102 that the computing ends. The neural network processor obtains, from the memory 103 using the bus 101, input data, an input parameter, and an instruction that are used for neural network computing. The input data includes neural network data that needs to be computed, for example, to-be-identified image data and sound data. The input parameter includes a parameter used for neural network computing, for example, a neural network parameter that is trained offline. The instruction includes information for indicating a neural network layer, and the neural network processor configures, according to the instruction, a computing mode of a corresponding neural network layer. The computing mode may include operations such as multiplication, addition, and radication, or a combination of these operations. Optionally, the neural network processor may process computing of a plurality of neural network layers, for example, a convolutional layer, a fully connected layer, a pooling layer, and a normalized layer.

It can be learned that a difference between performing a neural network operation using only the CPU and performing a neural network operation using both the CPU and the neural network processor lies in the following. When the neural network operation is performed using only the CPU, the CPU does not interact with the neural network processor, in other words, the CPU does not need to control the neural network processor to start or end the computing because the CPU itself performs computing. However, because the CPU is different from the neural network processor in design focuses, operation efficiency of the CPU for large-scale parallel operations inevitably included in the neural network is lower than that of the neural network processor. Therefore, a manner of combining the CPU and the neural network processor is more common during neural network computing. However, this is not limited in this embodiment of this application.

One neural network may include a plurality of neural network layers, and a same neural network layer may appear in a neural network for a plurality of times. For example, a neural network layer required for identifying an image includes a convolutional layer, a sigmoid layer, a pooling layer, a sigmoid layer, a pooling layer, and a fully connected layer. The foregoing neural network layer includes two sigmoid layers and two pooling layers. When the processor 102 includes a neural network processor, during neural network computing, the neural network processor sequentially computes layers of the neural network layer. A computing result of a current neural network layer may be used as an input of a next layer of the neural network layer for computing. In the foregoing example, input data of the convolutional layer is an input parameter and input data of an image, and a computing result obtained after the computing is performed at the convolutional layer is used as input data of the sigmoid layer.

For another example, when the processor 102 includes a neural network processor, in a complete process of performing computing at one layer of the neural network, the neural network processor first reads, from the memory 103 using the bus 101, input data, an input parameter, and an instruction that need to be processed. Because different modes of data computing need to be performed when computing is performed at different neural network layers, an input parameter and an instruction that are read are related to a specific type of a neural network layer. The neural network processor computes the input data and the input parameter according to a corresponding instruction, and writes an obtained computing result into the memory 103 using the bus 101. The computing result is used as data required for subsequent neural network layer computing. During computing at a next layer of the neural network layer, the neural network processor reads the input data and the input parameter from the memory 103 again using the bus 101. The input data that is read may include a computing result of a previous layer of the neural network layer or data that is not computed.

To further understand a computing capability of the neural network processor to distinguish the neural network processor from the conventional processor such as a CPU, the following briefly describes an internal computing structure of the neural network processor. Currently, a GPU is most frequently used in several common neural network processors. Therefore, the following mainly uses the GPU as an example. The GPU is compared with the CPU to describe a structure and a computing feature of the GPU.

The GPU is also referred to as a display core, a visual processor, or a display chip, and is a microprocessor dedicated to image computing. The GPU is similar to the CPU, but the GPU is specially designed to perform complex mathematical and geometric computing. For example, GPU acceleration computing can provide extraordinary application performance because the GPU acceleration computing transfers application-intensive work to the GPU. At the same time, the CPU still runs the rest of program code because the CPU includes several cores that are specially optimized for sequential serial processing, and the GPU has a large-scale parallel computing architecture including thousands of smaller and more efficient cores (which are specially designed to process a plurality of tasks at the same time). A complexity of computing that can be processed by a single core in the GPU is far less than a complexity of computing that can be processed by a single core in the CPU. With development of technologies, the complexity of computing that can be processed by the single core in the GPU is increasingly high, but computing work of the single core still needs to be controlled and triggered by the CPU. The GPU and the CPU greatly differ because the GPU and the CPU are designed for different objectives, and are for two different application scenarios. For example, the CPU requires both very strong commonality to process various types of data, and logic determining. Therefore, a large amount of branch jumping and interrupt processing is introduced. Consequently, an internal structure of the CPU is very complex. However, the GPU is faced with independent massive data of a similar type and a pure computing environment that does not need to be interrupted. Primary processing objectives of the GPU are computing and data throughputs. Primary objectives of a transistor inside the CPU are to shorten a processing delay and keep pipelines busy. Therefore, the GPU is better than the CPU in terms of intensive computing. In conclusion, the CPU and GPU are designed differently because the CPU and GPU are originally used to process different tasks. However, when some tasks are similar to problems that the GPU is originally used to resolve, the GPU may be used.

The following describes the method and the apparatus provided in the embodiments of this application with reference to the accompanying drawings in the embodiments of this application.

Embodiment 1

Figure 2:
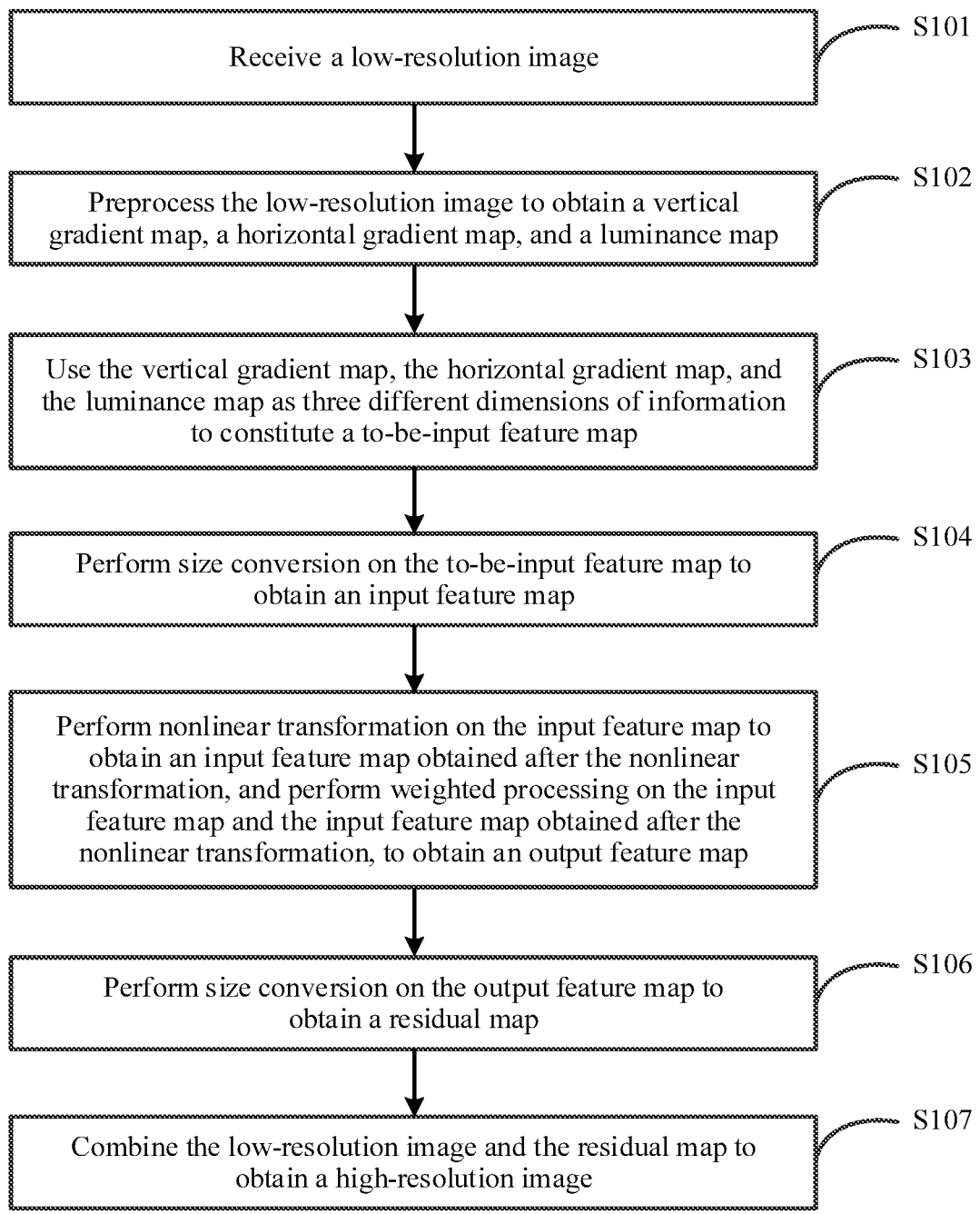
FIG. 2 is a schematic flowchart of an image super-resolution method according to an embodiment of this application.

FIG. 2 is a schematic flowchart of an image super-resolution method according to an embodiment of this application. As shown in FIG. 2, the image super-resolution method includes but is not limited to the following steps S201 to S207.

S201. Receive a low-resolution image.

It should be noted that the low-resolution image received in step 201 is obtained by performing related processing on an original image that is initially obtained, and the related processing manner is usually a bicubic interpolation manner. Specifically, bicubic interpolation is also referred to as bicubic interpolation, and is a method for performing "interpolation" or increasing a "pixel" quantity/density in an image. An interpolation technology is usually used to increase graphics data such that a print area and/or a resolution can be increased when the graphics data is printed or output in other forms. An objective of the related processing is to enable the low-resolution image to be larger than the original image, and a size of the low-resolution image is the same as a size of a finally obtained high-resolution image.

S202. Preprocess the low-resolution image to obtain a vertical gradient map, a horizontal gradient map, and a luminance map.

The vertical gradient map represents vertical transformation between adjacent pixels in the image, the horizontal gradient map represents horizontal transformation between adjacent pixels in the image, and the luminance map represents luminance information of the image.

A preprocessing manner in step 202 is further as follows. Different feature extraction is performed on the low-resolution image to obtain different features, and the different features constitute the foregoing three different feature maps (the vertical gradient map, the horizontal gradient map, and the luminance map). When feature extraction is performed by performing a convolution operation, three different convolution kernels may be separately used to perform a convolution operation on the low-resolution image, to obtain the vertical gradient map, the horizontal gradient map, and the luminance map.

S203. Use the vertical gradient map, the horizontal gradient map, and the luminance map as three different dimensions of information to constitute a to-be-input feature map.

Specifically, that the vertical gradient map, the horizontal gradient map, and the luminance map are used as three different dimensions of information to constitute a to-be-input feature map may be combining the vertical gradient map, the horizontal gradient map, and the luminance map. For example, when the vertical gradient map, the horizontal gradient map, and the luminance map are all two-dimensional maps of X*Y, the to-be-input feature map obtained after the combining is 3*X*Y, in other words, a depth Z of the to-be-input feature map is 3.

S204. Perform size conversion on the to-be-input feature map to obtain an input feature map.

It should be noted that, because a size of the image may change after the preprocessing in step 202, to enable subsequent processing steps to be successfully performed, size conversion (which may also be referred to as dimension conversion, where this is the same in the following, and details are not described) needs to be performed on the to-be-input feature map to obtain the input feature map. The size conversion is usually performed by performing a convolution operation, and certainly may be performed in another manner. This is not limited in this embodiment of this application.

S205. Perform nonlinear transformation on the input feature map to obtain an input feature map obtained after the nonlinear transformation, and perform weighted processing on the input feature map and the input feature map obtained after the nonlinear transformation, to obtain an output feature map.

Specifically, in step 205 in this embodiment of this application, weighted processing is performed on the input feature map and the input feature map obtained after the nonlinear transformation. In this embodiment of this application, the foregoing weighted processing may be performed using a highway network. The highway network has been described above. A transmission gate (transform gate) and a carry gate are introduced into a weight obtaining branch, and the transmission gate is referred to as T for short and the carry gate is referred to as C for short below. T is essentially a weighting value learned by the transmission gate using a neural network, and therefore is also referred to as T below, where C=1−T. As described above, there are three branches in the highway network. A weight obtaining branch thereof is used to obtain a weighting value based on the input feature map and output the weighting value T. A branch thereof is used to perform nonlinear transformation on an input signal based on at least one hidden layer (for example, there are n hidden layers herein). A branch thereof is to skip the n hidden layers and directly connect to a specific layer. In this embodiment of this application, the input feature map on which weighted processing is performed is directly obtained based on the foregoing direct branch, and the input feature map obtained after the nonlinear transformation is obtained by performing nonlinear transformation at the n hidden layers. Two probabilities T and C are respectively assigned to the input feature map after the nonlinear transformation and the input feature map, and then weighted processing is performed to obtain the output feature map. T is assigned to the feature map obtained after the nonlinear transformation, and C is assigned to the input feature map.

S206. Perform size conversion on the output feature map to obtain a residual map.

Similar to the objective of step 204, because a size of the output feature map may change after the processing in the middle several steps, to implement step 207, size conversion needs to be performed on the output feature map such that a size of the residual map obtained after the conversion is the same as the size of the low-resolution image. This helps to combine the low-resolution image and the residual map. The size conversion is usually performed by performing a convolution operation, and certainly may be performed in another manner. This is not limited in this embodiment of this application.

S207. Combine the low-resolution image and the residual map to obtain a high-resolution image.

Specifically, in step 207, a residual network is used. In an embodiment, in addition to a processing branch through which the residual map is obtained after the foregoing series of processing, there is a direct branch. The direct branch is an output that directly skips several layers and connects to a specific layer in a CNN. In this embodiment of this application, an output of the direct branch is the low-resolution image in step 207. The two feature maps combined in step 207 include the residual map obtained after multi-layer network processing (a multi-layer network herein includes but is not limited to the highway network, and the included highway network is used to process step 205), and the low-resolution image directly obtained using the direct branch. Combining the residual map and the low-resolution image is essentially combining a pixel in the residual map and a pixel in the low-resolution image, to obtain the high-resolution image, and complete an image super-resolution process.

It should be noted that the method provided in Embodiment 1 may be an image super-resolution method based on a deep neural network. The deep neural network includes an input layer, at least one hidden layer, and an output layer. The input layer may be used to receive a low-resolution image. The at least one hidden layer may be used to process S202 to S207. The output layer may be used to output the high-resolution image. It may be understood that the foregoing highway network and the foregoing residual network are formed using a connection relationship between layers of neural networks in the deep neural network. Related parts of the following embodiments and implementations are similar to those described herein, and details are not described herein.

In this embodiment of this application, the output feature map in step 205 is obtained by performing weighted processing on the input feature map and the input feature map obtained after the nonlinear transformation. Therefore, the processing process in step 205 includes the input feature map directly obtained using the direct branch, and the direct branch overcomes a gradient disappearance problem of the deep neural network to some extent, thereby achieving a better convergence effect. In addition, in step 205, weighted processing is performed on the input feature map and the input feature map obtained after the nonlinear transformation. In other words, the different weighting values T and C are respectively assigned to the input feature map and the input feature map obtained after the nonlinear transformation. Therefore, a better super-resolution effect can be achieved. Moreover, in step 207, the low-resolution image and the residual map are combined to obtain the high-resolution image. In other words, the low-resolution image is directly obtained using the direct branch. Therefore, this embodiment of this application further overcomes the gradient disappearance problem of the deep neural network, further improves convergence performance of the deep neural network, and finally achieves a better image super-resolution effect.

Embodiment 2

Embodiment 2 includes all steps of Embodiment 1, and on the basis of Embodiment 1, further includes S205a. S205a is before step 205, and S205a includes obtaining a group of weighting values based on the input feature map, where the group of weighting values are used to perform weighted processing on the input feature map and the input feature map obtained after the nonlinear transformation.

Specifically, the obtaining a group of weighting values based on the input feature map includes performing a convolution operation on the input feature map to obtain a convolution result, and processing the convolution result based on an S-shaped function to obtain a weighting value T. The weighting value T is used to perform weighted processing on the input feature map and the input feature map obtained after the nonlinear transformation.

Specifically, as described in step 205 in Embodiment 1, the highway network includes a branch used to obtain the weighting value T. The branch may obtain the weighting value T based on a trained deep neural network and output the weighting value T. A specific weight obtaining method may be the method described in S205*a* in Embodiment 2, in an embodiment, the convolution operation is performed on the input feature map to obtain the convolution result, and the convolution result is processed based on the S-shaped function to obtain the weighting value T. The S-shaped function herein is also referred to as a sigmoid function. Because of properties such as monotonic increasing and inverse function monotonic increasing, the sigmoid function is usually used as a threshold function of the neural network to map a variable between 0 and 1.

Optionally, on the basis of Embodiment 1 or Embodiment 2, in a possible implementation, the performing nonlinear transformation on the input feature map to obtain an input feature map obtained after the nonlinear transformation in step 205 includes performing a de-fitting operation on the input feature map to obtain a de-fitting result, and performing a convolution operation on the de-fitting result to obtain the input feature map obtained after the nonlinear transformation.

Figure 2A:
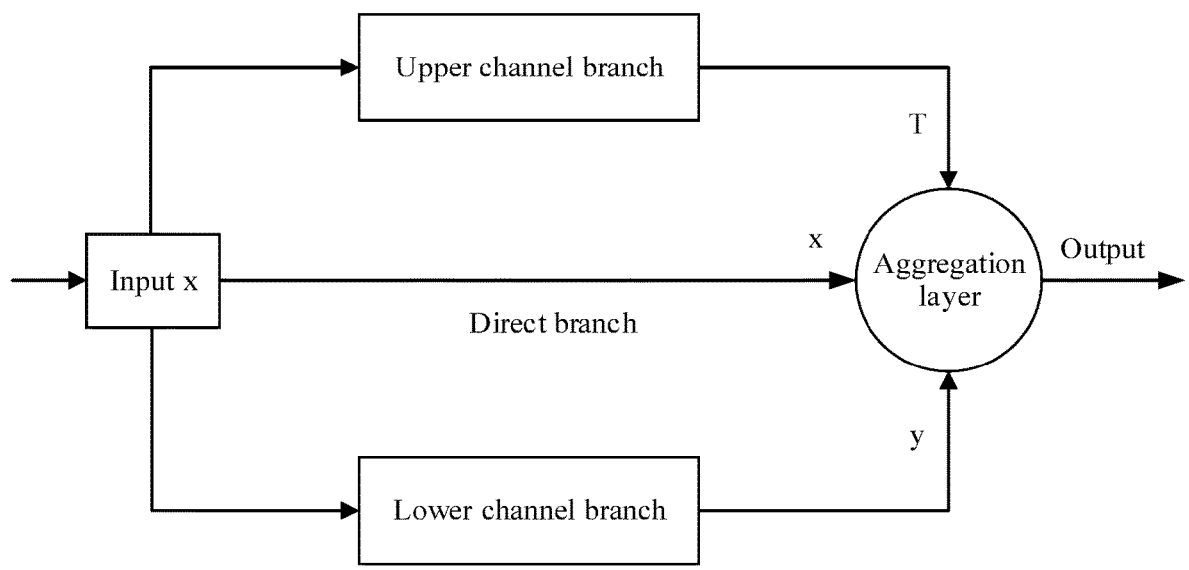
FIG. 2A is a schematic structural diagram of a highway unit according to an embodiment of this application.

Optionally, on the basis of Embodiment 1 or Embodiment 2, referring to FIG. 2A, in a possible implementation, FIG. 2A may be used to represent a single highway unit that follows a highway network structure. The highway unit includes three branches (for this, refer to the foregoing descriptions of the highway network, where details are not described herein again) an upper channel branch shown in FIG. 2A configured to obtain the weighting value T, a lower channel branch shown in FIG. 2A configured to perform nonlinear transformation on an output signal based on at least one hidden layer (for example, there are n hidden layers herein), and a direct branch shown in FIG. 2A, which skip processing of the n hidden layers, and directly transmit a signal x that is input into the highway network unit to an aggregation layer in FIG. 2A. The aggregation layer is configured to perform, based on the weighting value T obtained by the upper channel branch, weighted processing on the input feature map (represented by an input x in FIG. 2A) and the input feature map obtained after the nonlinear transformation (represented by y in FIG. 2A). The weighted processing herein is weighted addition. Optionally, the weighting value T is assigned to the input feature map obtained after the nonlinear transformation, and (1−T) is assigned to the input feature map. Specifically, this may be represented by the following formula Output=T*y+(1−T)*x, where Output is an output of the aggregation layer in FIG. 2A, namely, the output feature map in this embodiment of this application, y is the input feature map obtained after the nonlinear transformation, and x is the input feature map.

Figure 2B:
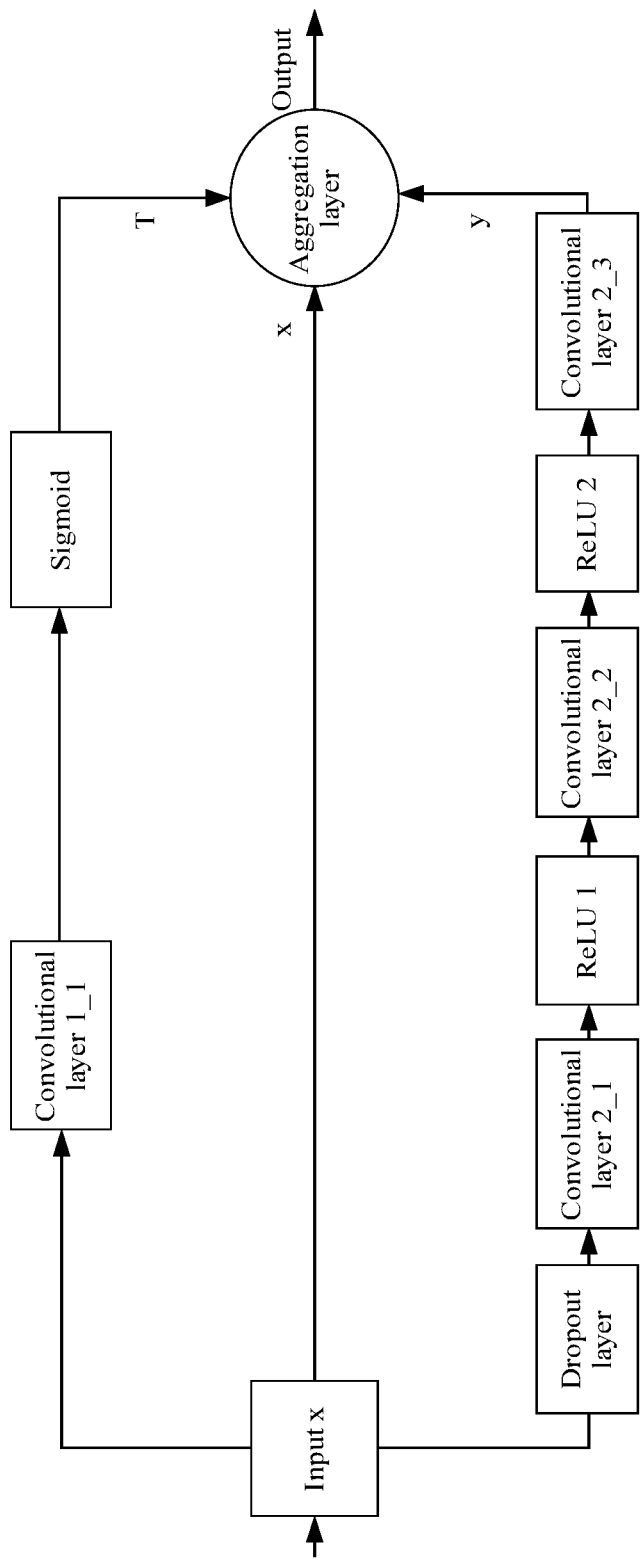
FIG. 2B is a schematic structural diagram of a highway unit according to an embodiment of this application.

Optionally, FIG. 2B is a specific description of FIG. 2A. As shown in FIG. 2B, the upper channel branch may include a convolutional layer and a sigmoid layer, and may be specifically formed by connecting a convolutional layer 1-1 and the sigmoid layer in series. The lower channel branch may include a dropout layer, a convolutional layer, and a rectified linear unit (ReLU) layer, and may be specifically formed by sequentially connecting the dropout layer, a convolutional layer 2-1, an ReLU 1, a convolutional layer 2-2, an ReLU 2, and a convolutional layer 2-3 in series. The ReLU function is usually used as an activation function of a neuron. The ReLU function is essentially a piecewise linear function in which all negative values can be changed into 0 and positive values remain unchanged. This operation is referred to as unilateral suppression, and because of the unilateral suppression, neurons in the neural network can be sparsely activated. A sparser neural network implemented using the ReLU can better obtain related features and fit training data.

The processing process may correspond to the foregoing descriptions of step 205 in Embodiment 1, in an embodiment, one branch is configured to perform nonlinear transformation on an input signal based on at least one hidden layer. In this embodiment of this application, the nonlinear transformation includes processing of the dropout layer and processing of the convolutional layer. The dropout layer is configured to perform a de-fitting operation. As described above, the de-fitting operation is performed on the input feature map to obtain the de-fitting result, and the convolution operation is performed on the de-fitting result. In this embodiment of this application, the de-fitting operation is first performed on the input feature map such that a quantity of parameters is reduced at the beginning. In this way, in a subsequent process of performing the convolution operation on the de-fitting result, because a quantity of input parameters of the convolution operation is reduced, a calculation amount of the convolution operation is reduced. This reduces super-resolution consumption, and increases an image super-resolution speed.

In Embodiment 1 or Embodiment 2, or an implementation based on Embodiment 1 or Embodiment 2, further optionally, step 207 may specifically include the following at least two specific implementations.

S2071. Add a pixel value of each pixel in the low-resolution image and a pixel value of a corresponding pixel in the residual map to obtain a pixel value of a corresponding pixel in the high-resolution image.

S2072. Perform weighted addition on a pixel value of each pixel in the low-resolution image and a pixel value of a corresponding pixel in the residual map to obtain a pixel value of a corresponding pixel in the high-resolution image.

A difference between step 2071 and step 2072 lies in the following. In step 2071, a manner of combining the low-resolution image and the residual map is to add pixel values at corresponding positions in the low-resolution image and the residual map, and use a result obtained after the addition as pixel values at positions in the high-resolution image that correspond to the corresponding positions in the low-resolution image and the residual map. In step 2072, combining the low-resolution image and the residual map is not performing only addition, but performing weighted addition using the weighting value. In step 2072, a coefficient used for the weighted addition is obtained through deep neural network learning (also referred to as neural network training), and in a process of learning the weighting value using the deep neutral network, the learned weighting coefficient may enable the output high-resolution image to have optimal image quality. Therefore, in step 2072, the high-resolution image output during image super-resolution may have better quality.

Embodiment 3

Figure 3:
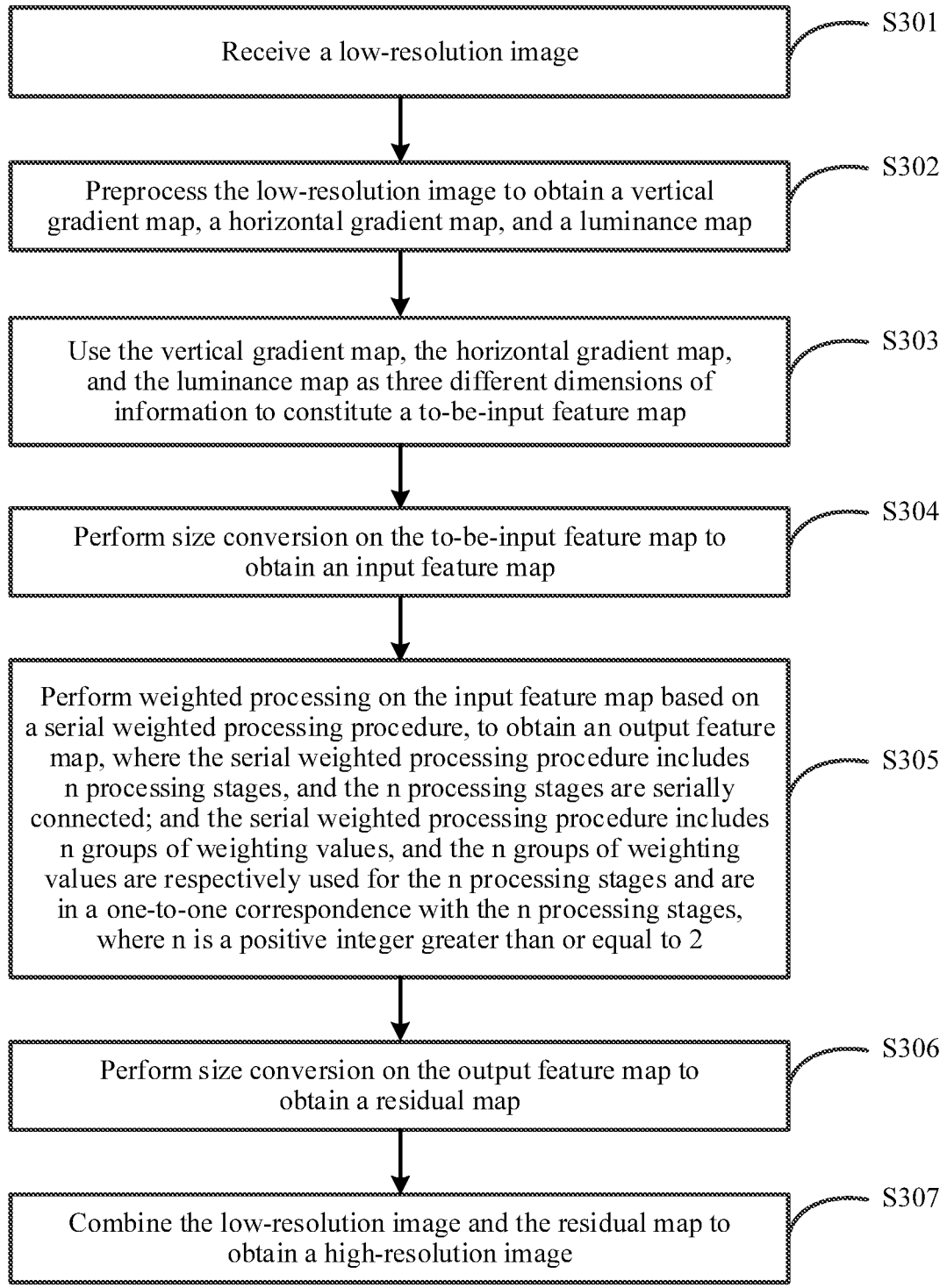
FIG. 3 is a schematic flowchart of an image super-resolution method according to an embodiment of this application.

FIG. 3 is a schematic flowchart of an image super-resolution method according to an embodiment of this application. As shown in FIG. 3, the image super-resolution method includes but is not limited to the following steps S301 to S307.

S301. Receive a low-resolution image.

S302. Preprocess the low-resolution image to obtain a vertical gradient map, a horizontal gradient map, and a luminance map.

S303. Use the vertical gradient map, the horizontal gradient map, and the luminance map as three different dimensions of information to constitute a to-be-input feature map.

S304. Perform size conversion on the to-be-input feature map to obtain an input feature map.

S305. Perform weighted processing on the input feature map based on a serial weighted processing procedure, to obtain an output feature map, where the serial weighted processing procedure includes n processing stages, and the n processing stages are serially connected, and the serial weighted processing procedure includes n groups of weighting values, and the n groups of weighting values are respectively used for the n processing stages and are in a one-to-one correspondence with the n processing stages, where n is a positive integer greater than or equal to 2.

S306. Perform size conversion on the output feature map to obtain a residual map.

S307. Combine the low-resolution image and the residual map to obtain a high-resolution image.

Steps S301 to S304 are the same as steps S201 to S204 in Embodiment 1, a processing manner of step 306 is the same as that of step 206, and a processing manner of step 307 is the same as that of step 207. For brevity, for this, refer to related steps in Embodiment 1. Details are not described herein again.

A key difference between this embodiment of this application and Embodiment 1 lies in step 305.

As described in step 205 in Embodiment 1, the highway network is used in step 205, and a transmission gate T and a carry gate C are introduced. In essence, a weighting value T is obtained using a branch of the highway network, and a weighted proportion of an input feature map obtained after the nonlinear transformation is determined based on the weighting value T. In this case, step 305 is similar to step 205. A difference lies in the following. In step 205, a processing process of the highway network ends after a round of weighted processing, and the output feature map is output for processing in step 206. However, in Embodiment 3, a plurality of rounds of weighted processing are performed in step 307, and the plurality of rounds of weighted processing constitute the serial weighted processing procedure in S307. Specifically, the serial weighted processing procedure includes the n processing stages, each processing stage may be understood as a highway network processing procedure, and a complete highway network processing procedure of a minimum unit may be described in step 205, including three branches. Details are not described herein again. A difference lies in the following. Step 307 in Embodiment 3 includes a plurality of highway network processing procedures, the highway network processing procedures are serially connected, and each highway network processing procedure includes a weight obtaining branch of the highway network. In addition, a weighting value of the highway network is obtained using the weight obtaining branch, and the weighting value obtained in the highway network processing procedure is used by the highway network, that is, "the n group weighting values are respectively used for the n processing stages and are in a one-to-one correspondence with the n processing stages" described in step 305. In a single highway network processing procedure, in other words, in one of the foregoing n processing stages, a processing procedure is the same as that in step 205, but an input and an output are different from those in step 205. For example, in the first processing stage in the serial procedure, an input is an output of step 304, namely, the input feature map, but an output is not directly output as the output feature map but a next processing stage starts after subsequent processing of the highway network. The foregoing related operations of the highway network continue to be performed, an obtained output is used as an input of a next highway network, and a next processing stage starts, until the last stage in the serial procedure is completed. An output of the last stage is used as an output of step 305, in other words, the output feature map is used as an input of a next step 306.

The plurality of highway network processing procedures are serially connected because performing weighted processing on the input feature map using the serial weighted processing procedure can obtain a better result than the single highway network processing procedure, in other words, quality of the finally obtained high-resolution image is better, and an image super-resolution effect is better.

It should be noted that the method provided in Embodiment 3 may be an image super-resolution method based on a deep neural network. The deep neural network includes an input layer, at least one hidden layer, and an output layer. The input layer may be configured to receive a low-resolution image. The at least one hidden layer may be configured to process S302 to S307. The output layer may be configured to output the high-resolution image. It may be understood that the foregoing highway network and the foregoing residual network are formed using a connection relationship between layers of neural networks in the deep neural network. Related parts of the following embodiments are similar to those described herein, and details are not described herein.

It should be noted that, on the basis of Embodiment 3, in a possible implementation, n is equal to 3, in other words, the serial weighted processing procedure in step 305 includes three processing stages.

Researches show that a better super-resolution effect than other values can be obtained when three highway network processing procedures are serially connected.

On the basis of Embodiment 3, to make each of the n processing stages clearer, a possible implementation is specifically as follows.

A processing process of a current processing stage in the n processing stages includes separately performing upper channel processing and lower channel processing on an input feature map of the current processing stage. The upper channel processing includes obtaining a group of weighting values of the current processing stage based on the input feature map of the current processing stage. The lower channel processing includes performing nonlinear transformation to obtain a nonlinear transformation result through the lower channel processing, and performing weighted processing on the input feature map of the current processing stage and the nonlinear transformation result based on the group of weighting values that are in a one-to-one correspondence with the current processing stage, to obtain an output feature map of the current processing stage. The current processing stage is any one of the n processing stages. When the current processing stage is the first stage in the serial weighted processing procedure, the input feature map of the current processing stage is the input feature map. Alternatively, when the current processing stage is the last stage in the serial weighted processing procedure, the output feature map of the current processing stage is the output feature map.

It should be noted that, in this possible implementation, the obtaining a weighting value on an upper channel may be understood as a branch that is in the three branches of the highway network in step 205 and that is configured to obtain a weighting value T. A specific operation of the branch may include performing a convolution operation on the input feature map of the current processing stage to obtain an upper channel convolution result, and processing the upper channel convolution result based on an S-shaped function to obtain a group of weighting values of the current processing stage.

Further optionally, the lower channel processing may be understood as a branch that is in the three branches of the highway network in step 205 and that is configured to perform nonlinear transformation on an input signal based on at least one hidden layer (for example, there are n hidden layers herein). A specific operation of the branch may include performing de-fitting on the input feature map of the current processing stage to obtain a de-fitting result, and performing a convolution operation on the de-fitting result to obtain the nonlinear transformation result.

In this implementation of this embodiment of this application, the de-fitting operation is first performed on the input feature map such that a quantity of parameters is reduced at the beginning. In this way, in a subsequent process of performing the convolution operation on the de-fitting result, because a quantity of input parameters of the convolution operation is reduced, a calculation amount of the convolution operation is reduced. This reduces super-resolution consumption, and increases an image super-resolution speed.

On the basis of Embodiment 3, to make each of the n processing stages clearer, another possible implementation is specifically as follows.

The performing weighted processing on the input feature map based on a serial weighted processing procedure, to obtain an output feature map includes a processing process of a processing stage i in the n processing stages includes performing nonlinear transformation on an input feature map of the processing stage i to obtain an input feature map of the processing stage i obtained after the nonlinear transformation, and performing, based on a group of weighting values that are in a one-to-one correspondence with the processing stage i, weighted processing on the input feature map of the processing stage i and the input feature map of the processing stage i obtained after the nonlinear transformation, to obtain an output feature map of the processing stage i. The processing stage i is any one of the n processing stages, and $1 \leq i \leq n$. When the processing stage i is the first stage in the serial weighted processing procedure, the input feature map of the processing stage i is the input feature map. Alternatively, when the processing stage i is the last stage in the serial weighted processing procedure, the output feature map of the processing stage i is the output feature map.

In this possible implementation, optionally, before the performing, based on a group of weighting values that are in a one-to-one correspondence with the processing stage i, weighted processing on the input feature map of the processing stage i and the input feature map of the processing stage i obtained after the nonlinear transformation, the method further includes obtaining the group of weighting values of the processing stage i based on the input feature map of the processing stage i, where the group of weighting values of the processing stage i are used to perform weighted processing on the input feature map of the processing stage i and the input feature map of the processing stage i obtained after the nonlinear transformation.

Further optionally, the obtaining the group of weighting values of the processing stage i based on the input feature map of the processing stage i includes performing a convolution operation on the input feature map of the processing stage i to obtain a convolution result, and processing the convolution result based on an S-shaped function to obtain the group of weighting values of the processing stage i.

In Embodiment 3 and some implementations based on Embodiment 3, further optionally, step 307 may further include the following at least two specific implementations.

S3071. Add a pixel value of each pixel in the low-resolution image and a pixel value of a corresponding pixel in the residual map to obtain a pixel value of a corresponding pixel in the high-resolution image.

S3072. Perform weighted addition on a pixel value of each pixel in the low-resolution image and a pixel value of a corresponding pixel in the residual map to obtain a pixel value of a corresponding pixel in the high-resolution image.

Step 3071 is similar to step 2071, step 3072 is similar to step 2072, and a difference between step 3071 and step 3072 is the same as a difference between step 2071 and step 2072. Therefore, for this, refer to the related descriptions in step 2071 and step 2072. Details are not described herein again.

The method in the embodiments of the present disclosure is described above in detail. The following provides an apparatus in the embodiments of the present disclosure.

Embodiment 4

Figure 4:
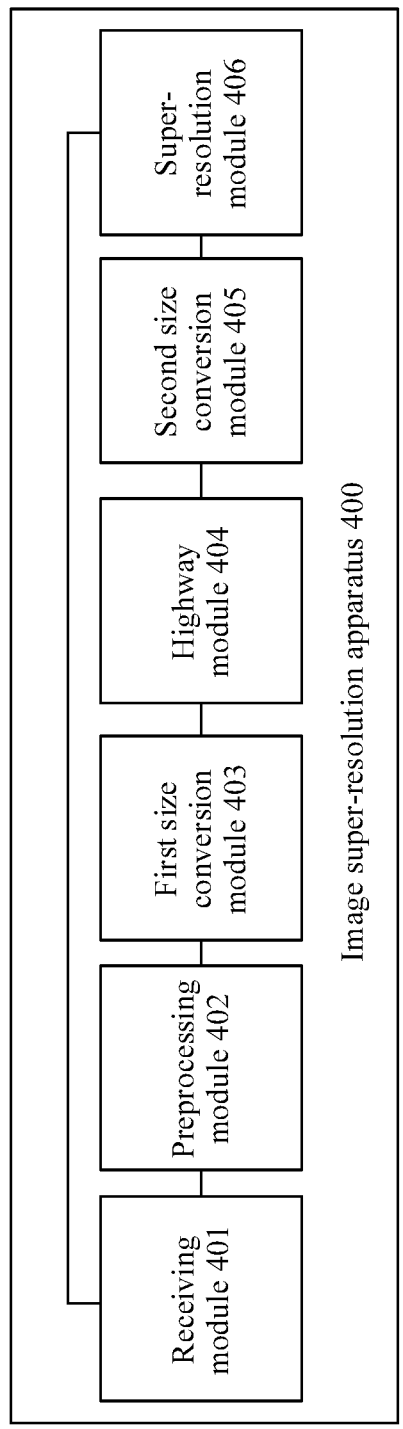
FIG. 4 is a schematic structural diagram of an image super-resolution apparatus according to an embodiment of this application.

FIG. 4 is a schematic structural diagram of an image super-resolution apparatus 400 according to an embodiment of this application. As shown in FIG. 4, the image super-resolution apparatus includes but is not limited to the following modules 401 to 406.

The receiving module 401 is configured to receive a low-resolution image.

The preprocessing module 402 is configured to preprocess the low-resolution image to obtain a vertical gradient map, a horizontal gradient map, and a luminance map, and use the vertical gradient map, the horizontal gradient map, and the luminance map as three different dimensions of information to constitute a to-be-input feature map.

The first size conversion module 403 is configured to perform size conversion on the to-be-input feature map to obtain an input feature map.

The highway module 404 is configured to perform nonlinear transformation on the input feature map to obtain an input feature map obtained after the nonlinear transformation, and perform weighted processing on the input feature map and the input feature map obtained after the nonlinear transformation, to obtain an output feature map.

The second size conversion module 405 is configured to perform size conversion on the output feature map to obtain a residual map.

The super-resolution module 406 is configured to combine the low-resolution image and the residual map to obtain a high-resolution image.

Specifically, for descriptions corresponding to the processing manners of the modules, refer to the descriptions of step 201 to step 207 in Embodiment 1. Because the apparatus 400 provided in Embodiment 4 of this application is configured to implement the method provided in Embodiment 1, descriptions of corresponding steps are consistent with the descriptions in Embodiment 1, and corresponding technical effects also need to be the same. Details are not described herein again.

On the basis of Embodiment 4, in an optional implementation, the apparatus 400 may further include a weight obtaining module configured to obtain a group of weighting values based on the input feature map, where the group of weighting values are used to perform weighted processing on the input feature map and the input feature map obtained after the nonlinear transformation.

Optionally, the weight obtaining module may be further configured to perform a convolution operation on the input feature map to obtain a convolution result, and process the convolution result based on an S-shaped function to obtain a weighting value T. The weighting value T is used by the highway module to perform weighted processing on the input feature map and the input feature map obtained after the nonlinear transformation.

It can be learned from the foregoing descriptions that the weight obtaining module may be included in the highway module 404, and is used as an implementation carrier of a weight obtaining branch in the highway module 404. In other words, the weight obtaining module may be a sub-module of the highway module 404, and is used by the highway module 404 to obtain and output the weighting value T. Related processing details are the same as corresponding steps in Embodiment 1, and details are not described herein again.

In a technology of Embodiment 4 or the foregoing implementations, further optionally, the highway module 404 is further configured to perform a de-fitting operation on the input feature map to obtain a de-fitting result, and perform a convolution operation on the de-fitting result to obtain the input feature map obtained after the nonlinear transformation.

It can be learned from the foregoing descriptions that the processing process is a processing process of another branch (configured to perform nonlinear transformation on an input signal based on at least one hidden layer (for example, there are n hidden layers herein)) in the foregoing descriptions of the highway network. A specific processing manner and a technical effect are the same as the corresponding processing manner and technical effect in Embodiment 1 or Embodiment 2, or a possible implementation on the basis of Embodiment 1 or Embodiment 2. Details are not described herein again.

On the basis of Embodiment 4 and the possible implementations on the basis of Embodiment 4, further optionally, the super-resolution module 406 may be further configured to add a pixel value of each pixel in the low-resolution image and a pixel value of a corresponding pixel in the residual map to obtain a pixel value of a corresponding pixel in the high-resolution image, or the super-resolution module 406 may be further configured to perform weighted addition on a pixel value of each pixel in the low-resolution image and a pixel value of a corresponding pixel in the residual map to obtain a pixel value of a corresponding pixel in the high-resolution image.

For a difference between the foregoing two processing manners of the super-resolution module 406, refer to the descriptions in the method embodiment. Details are not described herein again.

Embodiment 5

Figure 5:
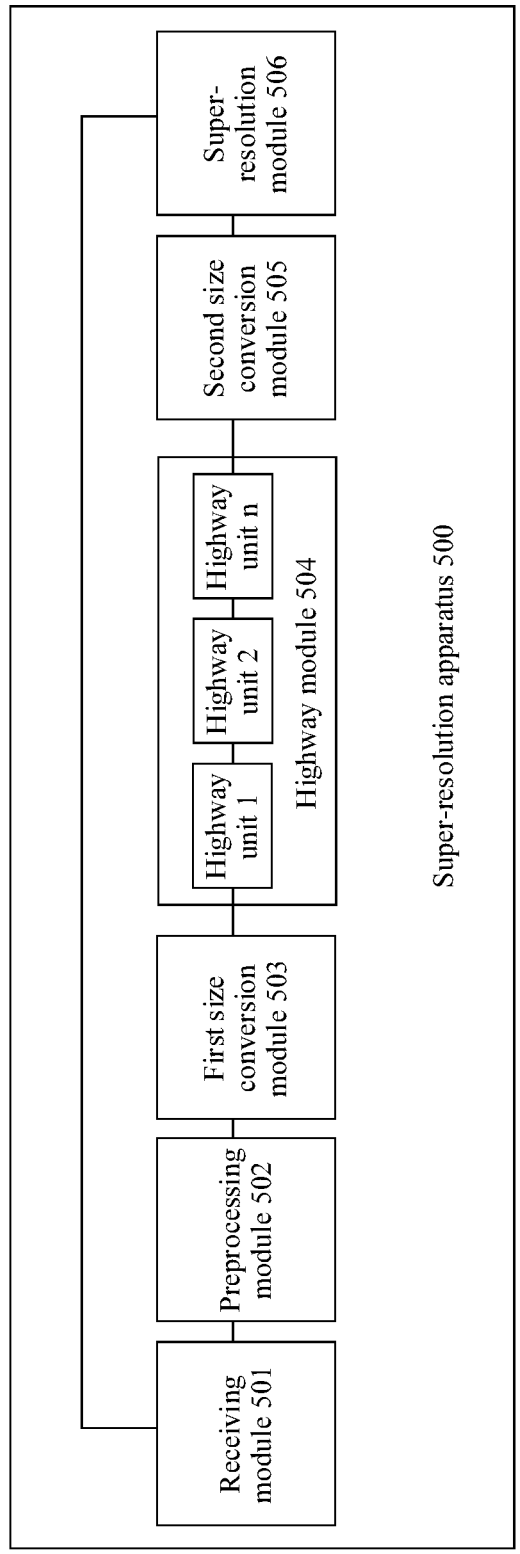
FIG. 5 is a schematic structural diagram of another image super-resolution apparatus according to an embodiment of this application.

FIG. 5 is a schematic structural diagram of an image super-resolution apparatus 500 according to an embodiment of this application. As shown in FIG. 5, the image super-resolution apparatus includes but is not limited to the following modules 501 to 506.

The receiving module 501 is configured to receive a low-resolution image.

The preprocessing module 502 is configured to preprocess the low-resolution image to obtain a vertical gradient map, a horizontal gradient map, and a luminance map, and use the vertical gradient map, the horizontal gradient map, and the luminance map as three different dimensions of information to constitute a to-be-input feature map.

The first size conversion module 503 is configured to perform size conversion on the to-be-input feature map to obtain an input feature map.

The highway module 504 is configured to perform weighted processing on the input feature map based on a serial weighted processing procedure, to obtain an output feature map. The serial weighted processing procedure includes n highway units, and the n highway units are serially connected. The serial weighted processing procedure includes n groups of weighting values, and the n groups of weighting values are respectively used for the n highway units and are in a one-to-one correspondence with the n highway units, where n is a positive integer greater than or equal to 2. In the highway module 204 in FIG. 5, for brevity, more possible highway units are omitted between a highway unit 2 and a highway unit n.

The second size conversion module 505 is configured to perform size conversion on the output feature map to obtain a residual map.

The super-resolution module 506 is configured to combine the low-resolution image and the residual map to obtain a high-resolution image.

Specifically, for descriptions corresponding to the processing manners of the modules, refer to the descriptions of step 301 to step 307 in Embodiment 3. Because the apparatus 500 provided in Embodiment 5 of this application is configured to implement the method provided in Embodiment 3, descriptions of corresponding steps are consistent with the descriptions in Embodiment 3, and corresponding technical effects also need to be the same. Details are not described herein again.

It should be noted that, on the basis of Embodiment 5, in a possible implementation, n is equal to 3, in other words, the highway module 504 includes three serially connected highway units.

Researches show that a better super-resolution effect than other values can be obtained when three highway network processing procedures are serially connected.

On the basis of Embodiment 5, to make a process in each of the n highway units clearer, a possible implementation is specifically as follows.

A first highway unit in the n highway units is further configured to separately perform upper channel processing and lower channel processing on an input feature map of the first highway unit. The upper channel processing includes obtaining a group of weighting values of the first highway unit based on the input feature map of the first highway unit. The lower channel processing includes performing nonlinear transformation to obtain a nonlinear transformation result through the lower channel processing, and performing weighted processing on the input feature map of the first highway unit and the nonlinear transformation result based on the group of weighting values that are in a one-to-one correspondence with the first highway unit, to obtain an output feature map of the first highway unit. The first highway unit is any one of the n first highway units. When the first highway unit is the first highway unit in the serial weighted processing procedure, the input feature map of the first highway unit is the input feature map. Alternatively, when the first highway unit is the last stage in the serial weighted processing procedure, the output feature map of the first highway unit is the output feature map.

It should be noted that, in this possible implementation, the obtaining a weighting value on an upper channel may be understood as a branch that is in the three branches of the highway network in step 205 and that is configured to obtain a weighting value T. A specific operation of the branch may include performing a convolution operation on the input feature map of the first highway unit to obtain a convolution result, and processing the convolution result based on an S-shaped function to obtain a group of weighting values of the first highway unit.

Further optionally, the lower channel processing may be understood as a branch that is in the three branches of the highway network in step 205 and that is configured to perform nonlinear transformation on an input signal based on at least one hidden layer (for example, there are n hidden layers herein). A specific operation of the branch may include performing de-fitting on the input feature map of the first highway unit to obtain a de-fitting result, and performing a convolution operation on the de-fitting result to obtain the nonlinear transformation result.

In this implementation of this embodiment of this application, the de-fitting operation is first performed on the input feature map such that a quantity of parameters is reduced at the beginning. In this way, in a subsequent process of performing the convolution operation on the de-fitting result, because a quantity of input parameters of the convolution operation is reduced such that a calculation amount of the convolution operation is reduced. This reduces super-resolution consumption, and increases an image super-resolution speed.

On the basis of Embodiment 5, to make a process in each of the n highway units clearer, another possible implementation is specifically as follows.

One highway unit i in the n highway units is further configured to perform nonlinear transformation on an input feature map of the highway unit i to obtain an input feature map of the highway unit i obtained after the nonlinear transformation, and perform, based on a group of weighting values that are in a one-to-one correspondence with the highway unit i, weighted processing on the input feature map of the highway unit i and the input feature map of the highway unit i obtained after the nonlinear transformation, to obtain an output feature map of the highway unit i, where the highway unit i is any one of the n highway units, and $1 \leq i \leq n$, and when the highway unit i is the first highway unit in the serial weighted processing procedure, the input feature map of the highway unit i is the input feature map, or when the highway unit i is the last highway unit in the serial weighted processing procedure, the output feature map of the highway unit i is the output feature map.

In this possible implementation, optionally, the apparatus further includes a weight obtaining module configured to obtain the group of weighting values of the highway unit i based on the input feature map of the highway unit i. The group of weighting values of the highway unit i are used to perform weighted processing on the input feature map of the highway unit i and the input feature map of the highway unit i obtained after the nonlinear transformation.

Further optionally, the weight obtaining module is further configured to perform a convolution operation on the input feature map of the highway unit i to obtain a convolution result, and process the convolution result based on an S-shaped function to obtain the group of weighting values of the highway unit i.

In Embodiment 5 and some implementations based on Embodiment 5, further optionally, the super-resolution 506 may be further configured to add a pixel value of each pixel in the low-resolution image and a pixel value of a corresponding pixel in the residual map to obtain a pixel value of a corresponding pixel in the high-resolution image, and use a color of the low-resolution image as a color of the high-resolution image, or perform weighted addition on a pixel value of each pixel in the low-resolution image and a pixel value of a corresponding pixel in the residual map to obtain a pixel value of a corresponding pixel in the high-resolution image, and use a color of the low-resolution image as a color of the high-resolution image.

For a difference between the foregoing two processing manners of the super-resolution module 506, refer to the descriptions in the method embodiment. Details are not described herein again.

Still referring to FIG. 1, when FIG. 1 is used to execute image super-resolution provided in the embodiments of this application, the memory 103 may be configured to store the foregoing super-resolution model.

The communications module 107 may be configured to communicate with another device, for example, may be configured to receive a low-resolution image that needs to be reconstructed.

The processor 102 may be one or more CPUs. When the processor 102 is one CPU, the CPU may be a single-core CPU, or may be a multi-core CPU. The processor 102 may further include a neural network processor such as the GPU, the NPU, or the TPU described above, and is configured to perform high-density parallel massive operations in a neural network.

The processor 102 is configured to read program code stored in the memory 103, to perform the following operations receiving a low-resolution image, preprocessing the low-resolution image to obtain a vertical gradient map, a horizontal gradient map, and a luminance map, using the vertical gradient map, the horizontal gradient map, and the luminance map as three different dimensions of information to constitute a to-be-input feature map, performing size conversion on the to-be-input feature map to obtain an input feature map, performing nonlinear transformation on the input feature map to obtain an input feature map obtained after the nonlinear transformation, and performing weighted processing on the input feature map and the input feature map obtained after the nonlinear transformation, to obtain an output feature map, performing size conversion on the output feature map to obtain a residual map, and combining the low-resolution image and the residual map to obtain a high-resolution image.

In a possible implementation, before the performing weighted processing on the input feature map and the input feature map obtained after the nonlinear transformation, the processor 102 further performs the following operations performing a convolution operation on the input feature map to obtain a convolution result, and processing the convolution result based on an S-shaped function to obtain a weighting value T, where the weighting value T is used to perform weighted processing on the input feature map and the input feature map obtained after the nonlinear transformation.

In a possible implementation, the performing, by the processor 102, nonlinear transformation on the input feature map to obtain an input feature map obtained after the nonlinear transformation includes performing a de-fitting operation on the input feature map to obtain a de-fitting result, and performing a convolution operation on the de-fitting result to obtain the input feature map obtained after the nonlinear transformation.

In a possible implementation, the combining, by the processor 102, the low-resolution image and the residual map to obtain a high-resolution image includes adding a pixel value of each pixel in the low-resolution image and a pixel value of a corresponding pixel in the residual map to obtain a pixel value of a corresponding pixel in the high-resolution image, or perform weighted addition on a pixel value of each pixel in the low-resolution image and a pixel value of a corresponding pixel in the residual map to obtain a pixel value of a corresponding pixel in the high-resolution image.

It should be noted that, for implementation of the foregoing operations, refer to corresponding descriptions in the method embodiment 1 shown in FIG. 2. Details are not described herein again. The foregoing image super-resolution device may be an image recognition device such as a facial recognition device. The foregoing image super-resolution device may alternatively be an image enhancement device or the like.

Alternatively, the processor 102 in the image super-resolution device is configured to read program code stored in the memory 103, to perform the following operations receiving a low-resolution image, preprocessing the low-resolution image to obtain a vertical gradient map, a horizontal gradient map, and a luminance map, using the vertical gradient map, the horizontal gradient map, and the luminance map as three different dimensions of information to constitute a to-be-input feature map, performing size conversion on the to-be-input feature map to obtain an input feature map, performing weighted processing on the input feature map based on a serial weighted processing procedure, to obtain an output feature map, where the serial weighted processing procedure includes n processing stages, and the n processing stages are serially connected, and the serial weighted processing procedure includes n groups of weighting values, and the n groups of weighting values are respectively used for the n processing stages and are in a one-to-one correspondence with the n processing stages, where n is a positive integer greater than or equal to 2, performing size conversion on the output feature map to obtain a residual map, and combining the low-resolution image and the residual map to obtain a high-resolution image.

In a possible implementation, in a current processing stage in the n processing stages, the processor 102 is further configured to separately perform upper channel processing and lower channel processing on an input feature map of the current processing stage. The upper channel processing includes obtaining a group of weighting values of the current processing stage based on the input feature map of the current processing stage. The lower channel processing includes performing nonlinear transformation to obtain a nonlinear transformation result through the lower channel processing, and performing weighted processing on the input feature map of the current processing stage and the nonlinear transformation result based on the group of weighting values that are in a one-to-one correspondence with the current processing stage, to obtain an output feature map of the current processing stage. The current processing stage is any one of the n processing stages. When the current processing stage is the first stage in the serial weighted processing procedure, the input feature map of the current processing stage is the input feature map. Alternatively, when the current processing stage is the last stage in the serial weighted processing procedure, the output feature map of the current processing stage is the output feature map.

Optionally, n is equal to 3.

In a possible implementation, the processor 102 is further configured to perform a convolution operation on the input feature map of the current processing stage to obtain an upper channel convolution result, and process the upper channel convolution result based on an S-shaped function to obtain a group of weighting values of the current processing stage.

In a possible implementation, the processor 102 is further configured to perform de-fitting on the input feature map of the current processing stage to obtain a de-fitting result, and perform a convolution operation on the de-fitting result to obtain the nonlinear transformation result.

In a possible implementation, the processor 102 is further configured to add a pixel value of each pixel in the low-resolution image and a pixel value of a corresponding pixel in the residual map to obtain a pixel value of a corresponding pixel in the high-resolution image, or perform weighted addition on a pixel value of each pixel in the low-resolution image and a pixel value of a corresponding pixel in the residual map to obtain a pixel value of a corresponding pixel in the high-resolution image.

It should be noted that, for implementation of the foregoing operations, refer to corresponding descriptions in the method embodiment 3 shown in FIG. 3. Details are not described herein again. The foregoing image super-resolution device may be an image recognition device such as a facial recognition device. The foregoing image super-resolution device may alternatively be an image enhancement device or the like.

An embodiment of the present disclosure further provides a chip system. The chip system includes at least one processing module, a memory, and an interface circuit. The memory, the interface circuit, and the at least one processing module are interconnected using a cable, and the at least one memory stores an instruction. When the instruction is executed by the processing module, the method procedure shown in FIG. 2 or FIG. 3 is implemented. The processing module includes at least a central processing unit, or may include a central processing unit and a neural network processor. There may be one or more central processing units, and there may be one or more neural network processors. A type of the neural network processor is not limited. If the processing module includes the central processing unit and the neural network processor, when the instruction is executed by the processing module, step 205 and step 207 in FIG. 2 are implemented by performing an operation based on the neural network processor in the processing module, and step 305 and step 307 in FIG. 3 are implemented by performing an operation based on the neural network processor in the processing module. Other steps may be implemented by the central processing unit, or may be implemented by the neural network processor. Certainly, the foregoing steps 205 and 207 and the foregoing steps 305 and 307 may alternatively be implemented by the central processing unit. This is not limited herein.

Figure 6:
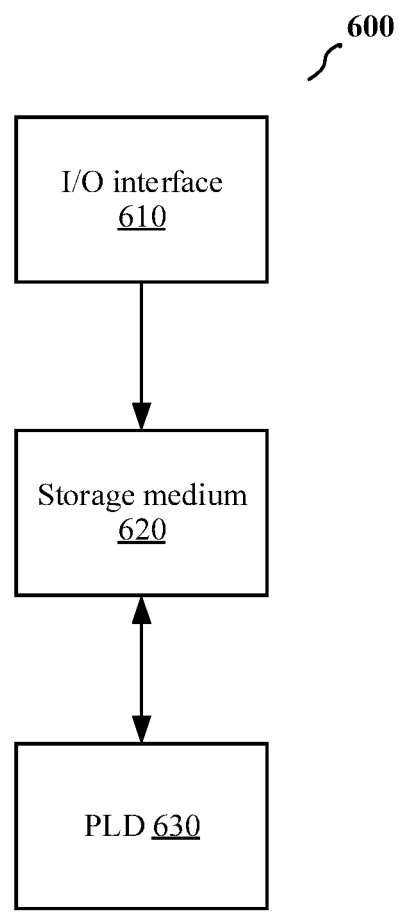
FIG. 6 is a schematic structural diagram of another electronic device used for neural network computing according to an embodiment of this application.

FIG. 6 is a schematic structural diagram of another electronic device 600 used for neural network computing, including an input/output (I/O) interface 610, a storage medium 620, and a PLD 630. The electronic device 600 reads, using the I/O interface 610, configuration data that is output by another device. For example, the electronic device 600 reads, from a personal computer (PC) using a joint test action group (JTAG) interface, a design netlist obtained after the layout and wiring. The storage medium 620 may include a RAM, a ROM, or a combination thereof, and is configured to store the read configuration data. The PLD 630 may be an FPGA or another PLD. The storage medium 620 and the PLD 630 may perform bidirectional data transmission. The PLD 630 reads the configuration data from the storage medium 620, and configures a plurality of internal logical blocks of the PLD 630 based on the configuration data, for example, configures a connection manner of a plurality of lookup tables in the configuration data, to form a neural network processor GPU, an NPU, or a TPU in the processor 102. The storage medium 620 may further store data used for computing, for example, input data and an input parameter, and store a computing result of the PLD 630.

An embodiment of the present disclosure further provides a computer-readable storage medium. The computer-readable storage medium stores an instruction, and when the instruction is run on a processor, the method procedure shown in FIG. 2 or FIG. 3 is implemented.

An embodiment of the present disclosure further provides a computer program product. When the computer program product is run on a processor, the method procedure shown in FIG. 2 or FIG. 3 is implemented.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a ROM or a RAM, a magnetic disk or an optical disc.

What is claimed is:
1. An image super-resolution method, comprising:
 receiving a low-resolution image;
 generating a vertical gradient map, a horizontal gradient map, and a luminance map by preprocessing the low-resolution image;
 generating a to-be-input feature map using the vertical gradient map, the horizontal gradient map, and the luminance map as three different dimensions of information;
 performing size conversion on the to-be-input feature map to obtain a first input feature map;
 obtaining, using a first branch of a deep neural network, a group of weighting values based on the first input feature map;
 providing, by the first branch, the group of weighting values to an aggregation layer of the deep neural network;
 performing, using a second branch of the deep neural network that comprises n hidden layers, nonlinear transformation on the first input feature map to obtain a second input feature map, wherein n is greater than one;
 providing, by the second branch, the second input feature map to the aggregation layer;
 providing, using a third branch that skips the n hidden layers, the first input feature map to the aggregation layer;
 performing, using the aggregation layer, weighted processing on the first input feature map and the second input feature map to obtain an output feature map;
 performing size conversion on the output feature map to obtain a residual map; and
 combining the low-resolution image and the residual map to obtain a high-resolution image.

2. The image super-resolution method of claim 1, wherein obtaining the group of weighting values comprises using a sigmoid function to obtain the group of weighting values.

3. The image super-resolution method of claim 2, further comprising:
 performing a convolution operation on the first input feature map to obtain a convolution result; and
 processing the convolution result based on the sigmoid function to obtain the group of weighting values.

4. The image super-resolution method of claim 1, further comprising:
 performing a de-fitting operation on the first input feature map to obtain a de-fitting result; and
 performing a convolution operation on the de-fitting result to obtain the second input feature map.

5. The image super-resolution method of claim 1, further comprising adding a first pixel value of each pixel in the low-resolution image and a second pixel value of a corresponding pixel in the residual map to obtain a third pixel value of a corresponding pixel in the high-resolution image.

6. The image super-resolution method of claim 1, further comprising performing weighted addition on a first pixel value of each pixel in the low-resolution image and a second pixel value of a corresponding pixel in the residual map to obtain a third pixel value of a corresponding pixel in the high-resolution image.

7. The image super-resolution method of claim 1, further comprising training to perform expansion training on new data in an application to achieve a super-resolution effect in response to obtaining new training datasets.

8. An image super-resolution apparatus, comprising:
 a processor; and
 a memory coupled to the processor and storing instructions that, when executed by the processor, cause the image super-resolution apparatus to be configured to:

receive a low-resolution image;
generate a vertical gradient map, a horizontal gradient map, and a luminance map by preprocessing the low-resolution image;
generate a to-be-input feature map using the vertical gradient map, the horizontal gradient map, and the luminance map as three different dimensions of information;
perform size conversion on the to-be-input feature map to obtain a first input feature map;
implement a deep neural network comprising:
  an aggregation layer;
  a first branch configured to:
    obtain a group of weighting values based on the first input feature map; and
    provide the group of weighting values to the aggregation layer;
  a second branch comprising n hidden layers and configured to:
    perform nonlinear transformation on the first input feature map to obtain a second input feature map; and
    provide the second input feature map to the aggregation layer, wherein n is greater than one; and
  a third branch that skips the n hidden layers and that is configured to provide the first input feature map to the aggregation layer,
  wherein the aggregation layer is configured to perform weighted processing on the first input feature map and the second input feature map to obtain an output feature map;
perform size conversion on the output feature map to obtain a residual map; and
combine the low-resolution image and the residual map to obtain a high-resolution image.

9. The image super-resolution apparatus of claim 8, wherein the instructions further cause the image super-resolution apparatus to be configured to obtain the group of weighting values using a sigmoid function.

10. The image super-resolution apparatus of claim 9, wherein the instructions further cause the image super-resolution apparatus to be configured to:
perform a convolution operation on the first input feature map to obtain a convolution result; and
process the convolution result based on the sigmoid function to obtain the group of weighting values.

11. The image super-resolution apparatus of claim 8, wherein the instructions further cause the image super-resolution apparatus to:
perform a de-fitting operation on the first input feature map to obtain a de-fitting result; and
perform a convolution operation on the de-fitting result to obtain the second input feature map.

12. The image super-resolution apparatus of claim 8, wherein the instructions further cause the image super-resolution apparatus to be configured to add a first pixel value of each pixel in the low-resolution image and a second pixel value of a corresponding pixel in the residual map to obtain a third pixel value of a corresponding pixel in the high-resolution image.

13. The image super-resolution apparatus of claim 8, wherein the instructions further cause the image super-resolution apparatus to be configured to perform weighted addition on a first pixel value of each pixel in the low-resolution image and a second pixel value of a corresponding pixel in the residual map to obtain a third pixel value of a corresponding pixel in the high-resolution image.

14. The image super-resolution apparatus of claim 8, wherein the instructions further cause the image super-resolution apparatus to be configured to perform the weighted processing by performing weighted addition.

15. A computer program product comprising computer-executable instructions that are stored on a non-transitory computer-readable medium and that, when executed by a processor, cause an image super-resolution apparatus to:
receive a low-resolution image;
generate a vertical gradient map, a horizontal gradient map, and a luminance map by preprocessing the low-resolution image;
generate a to-be-input feature map using the vertical gradient map, the horizontal gradient map, and the luminance map as three different dimensions of information;
perform size conversion on the to-be-input feature map to obtain a first input feature map;
implement a deep neural network comprising:
  an aggregation layer;
  a first branch configured to:
    obtain a group of weighting values based on the first input feature map; and
    provide the group of weighting values to the aggregation layer;
  a second branch comprising n hidden layers and configured to:
    perform nonlinear transformation on the first input feature map to obtain a second input feature map; and
    provide the second input feature map to the aggregation layer, wherein n is greater than one; and
  a third branch that skips the n hidden layers and that is configured to provide the first input feature map to the aggregation layer,
  wherein the aggregation layer is configured to perform weighted processing on the first input feature map and the second input feature map to obtain an output feature map;
perform size conversion on the output feature map to obtain a residual map; and
combine the low-resolution image and the residual map to obtain a high-resolution image.

16. The computer program product of claim 15, wherein the instructions further cause the image super-resolution apparatus to be configured to obtain the group of weighting values using a sigmoid function.

17. The computer program product of claim 16, wherein the instructions further cause the image super-resolution apparatus to be configured to:
perform a convolution operation on the first input feature map to obtain a convolution result; and
process the convolution result based on the sigmoid function to obtain the group of weighting values.

18. The computer program product of claim 15, wherein the instructions further cause the image super-resolution apparatus to:
perform a de-fitting operation on the first input feature map to obtain a de-fitting result; and
perform a convolution operation on the de-fitting result to obtain the second input feature map.

19. The computer program product of claim 15, wherein the instructions further cause the image super-resolution apparatus to be configured to add a first pixel value of each pixel in the low-resolution image and a second pixel value of a corresponding pixel in the residual map to obtain a third pixel value of a corresponding pixel in the high-resolution image.

20. The computer program product of claim 15, wherein the instructions further cause the image super-resolution apparatus to be configured to perform weighted addition on a first pixel value of each pixel in the low-resolution image and a second pixel value of a corresponding pixel in the residual map to obtain a third pixel value of a corresponding pixel in the high-resolution image.

* * * * *